(12) United States Patent
Do et al.

(10) Patent No.: US 11,818,070 B2
(45) Date of Patent: Nov. 14, 2023

(54) TECHNIQUE FOR SIDELINK RADIO COMMUNICATION

(71) Applicant: Telefonaktiebolaget LM Ericsson (publ), Stockholm (SE)

(72) Inventors: Hieu Do, Järfälla (SE); Ricardo Blasco Serrano, Espoo (FI); Ning He, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 421 days.

(21) Appl. No.: 17/278,586

(22) PCT Filed: Aug. 16, 2019

(86) PCT No.: PCT/EP2019/072017
§ 371 (c)(1),
(2) Date: Mar. 22, 2021

(87) PCT Pub. No.: WO2020/064214
PCT Pub. Date: Apr. 2, 2020

(65) Prior Publication Data
US 2021/0352597 A1 Nov. 11, 2021

Related U.S. Application Data

(60) Provisional application No. 62/736,855, filed on Sep. 26, 2018.

(51) Int. Cl.
*H04L 5/00* (2006.01)
*H04W 52/52* (2009.01)
(Continued)

(52) U.S. Cl.
CPC .......... *H04L 5/0053* (2013.01); *H04L 5/0044* (2013.01); *H04L 5/0051* (2013.01);
(Continued)

(58) Field of Classification Search
CPC . H04L 5/0053; H04L 5/0044; H04L 27/2602; H04W 72/20; H04W 52/52;
(Continued)

(56) References Cited

U.S. PATENT DOCUMENTS

2015/0146647 A1* 5/2015 Chatterjee ................. H04L 5/14
370/329
2017/0373735 A1* 12/2017 Kim ...................... H04W 72/21
(Continued)

FOREIGN PATENT DOCUMENTS

| EP | 1513270 A1 | 3/2005 |
| WO | 2017026511 A1 | 2/2017 |
| WO | 2018030949 A1 | 2/2018 |

OTHER PUBLICATIONS

International Search Report and Written Opinion dated Jan. 27, 2020 for International Application No. PCT/EP2019/072017 filed Aug. 16, 2019, consisting of 20-pages.
(Continued)

*Primary Examiner* — Nghi H Ly
(74) *Attorney, Agent, or Firm* — Christopher & Weisberg, P.A.

(57) ABSTRACT

A technique for transmitting and receiving a sequence of symbols on a sidelink, SL, in a transmission time interval, TTI, is described. As to a method aspect of the technique, an automatic gain control, AGC, is performed for the SL based on at least one first symbol of the SL in the TTI. Based on the AGC, SL control information, SCI, encoded in at least one second symbol of the SL in the TTI is received. Data encoded in at least one third symbol of the SL in the TTI is received based on the SCI.

20 Claims, 16 Drawing Sheets

(51) Int. Cl.
- *H04W 72/0446* (2023.01)
- *H04W 72/0453* (2023.01)
- *H04L 27/26* (2006.01)
- *H04W 72/20* (2023.01)

(52) U.S. Cl.
CPC ......... *H04L 27/2602* (2013.01); *H04W 52/52* (2013.01); *H04W 72/0446* (2013.01); *H04W 72/0453* (2013.01); *H04W 72/20* (2023.01)

(58) Field of Classification Search
CPC ......... H04W 72/0446; H04W 72/0453; H04W 92/02
USPC ........ 370/318, 328, 329, 338, 341, 345, 350
See application file for complete search history.

(56) References Cited

U.S. PATENT DOCUMENTS

| | | | |
|---|---|---|---|
| 2018/0139640 A1* | 5/2018 | Chae | .................. H04L 25/0204 |
| 2018/0145857 A1 | 5/2018 | Kim et al. | |
| 2018/0199343 A1 | 7/2018 | Deogun et al. | |
| 2018/0262312 A1* | 9/2018 | Lee | ....................... H04L 1/1812 |

OTHER PUBLICATIONS

3GPP TSG-RAN WG1 Meeting #94 R1-1809302; Title: Physical layer design of NR sidelink; Agenda Item: 7.2.4.1.2; Source: Ericsson; Document for: Discussion, Decision; Date and Location: Aug. 20-24, 2018, Goteborg, Sweden, consisting of 10-pages.

3GPP TSG RAN WG1 Meeting #84bis R1-162825; Title: L1 Format for V2V Transmissions using Sidelink; Agenda Item: 7.3.2.1; Source: Ericsson; Document for: Discussion and Decision; Date and Location: Apr. 11-15, 2016, Busan, South Korea, consisting of 4-pages.

3GPP TS 36.213 V14.1.0; 3rd Generation Partnership Project; Technical Specification Group Radio Access Network; Evolved universal Terrestrial Radio Access (E-UTRA); Physical layer procedures (Release 14); pp. 49-84, Dec. 2016, consisting of 414-pages.

3GPP TSG-RAN WG1 Meeting #88 R1-1703432; Title: UE behaviour; Source: Motorola Mobility; Work Item Code: LTE_V2X-Core; Date and Location: Feb. 13-17, 2017, Athens, Greece, consisting of 39-pages.

3GPP TSG RAN WG1 Meeting #89 R1-1707559; Title: Discussion on 64QAM support in PC5 operation; Agenda Item: 6.2.3.1.2; Source: LG Electronics; Document for: Discussion and decision; Date and Location: May 15-19, 2017, Hangzhou, China, consisting of 3-pages.

3GPP TSG RAN WG1 Meeting #94 R1-1808693; Title: Support of Sidelink Unicast, Groupcast and Broadcast Modes for NR V2X Communication; Agenda Item: 7.2.4.1.1; Source: Intel Corporation; Document for: Discussion and Decision; Date and Location: Aug. 20-24, 2018, Gothenburg, Sweden, consisting of 7-pages.

Japanese Office Action with English Summary Translation dated Aug. 23, 2022 for Patent Application No. 2021516787, consisting of 6-pages.

* cited by examiner

TECHNIQUE FOR SIDELINK RADIO COMMUNICATION

CROSS-REFERENCE TO RELATED APPLICATIONS

This application is a Submission Under 35 U.S.C. § 371 for U.S. National Stage Patent Application of International Application No.: PCT/EP2019/072017, filed Aug. 16, 2019 entitled "TECHNIQUE FOR SIDELINK RADIO COMMUNICATION," which claims priority to U.S. Provisional Application No. 62/736,855, filed Sep. 26, 2018, the entireties of both of which are incorporated herein by reference.

TECHNICAL FIELD

The present disclosure generally relates to a technique for radio communication on a sidelink. More specifically, methods and devices for transmitting and receiving a sequence of symbols on a sidelink in a transmission time interval as well as a corresponding signal structure are provided.

BACKGROUND

Radio communications involving at least one vehicle, also referred to as vehicle-to-everything (V2X) communications, carry both non-safety and safety information. Corresponding applications and services using the V2X communications are associated with a specific set of requirements, e.g., in terms of latency, reliability, capacity, etc. for transmitting messages known as Common Awareness Messages (CAM) and Decentralized Notification Messages (DENM) or Basic Safety Messages (BSM). The data volume of these messages is very low compared to mobile broadband (MBB) communications. Rather, safety-related V2X communications usually require high reliability, low latency and instant communication.

At least in certain situations, these requirements can be fulfilled only if the transmission is self-contained, that is by including control information and data in one transmission time interval (TTI). By blindly decoding the control information scrambled with an identifier, the identified radio device can receive the control information, e.g., a scheduling assignment, for instant data reception.

The Third Generation Partnership Project (3GPP) has specified V2X communications in the context of Long Term Evolution (LTE). FIG. 17 schematically illustrates a mapping of resources in time (on the horizontal axis) and frequency (on the vertical axis) for a physical sidelink control channel (PSCCH) and a physical sidelink shared channel (PSSCH) in LTE V2X. The two channels, PSCCH and PSSCH, are encoded and modulated separately.

As two radio devices move relative to each other and/or move within an environment that scatters and blocks radio propagation, the signal power received at a receiving radio device from a transmitting radio device varies irregularly. Hence, it may be unpredictable whether a receiver gain applied successfully for data reception in the last transmission time interval (TTI) is suitable for the current TTI, or renders data reception impossible in the current TTI. Therefore, each receiving radio device has to perform a mechanism for controlling its receiver gain, which is known as automatic gain control (AGC). For example, V2X communications according to LTE and New Radio (NR), as specified by 3GPP, largely include broadcast transmissions without power control.

In a conventional LTE V2X communication, the PSCCH and its associated PSSCH are multiplexed in frequency. More specifically, each of the channels is allocated a different group of resource blocks (RBs) contiguous in the frequency domain, which is illustrated in FIG. 3.7. Such a signal structure provides for a self-contained TTI. In this way of multiplexing, however, both channels have their first symbol as an AGC settling symbol. The remaining symbols include either demodulation reference signals (DMRSs) and sidelink control information (SCI) in case of PSCCH, or DMRSs and data in case of PSSCH. The demodulation of the two channels is performed separately using their respective DMRSs. For each channel, if the first symbol is not lost while performing AGC, i.e., the first symbol is not lost due to AGC settling, the DMRSs included in the first symbol may be used for the demodulation of the corresponding channel.

If the latest AGC setting is unsuitable for the current TTI, at least some symbols of the SCI in the TTI are lost, so that the control information and, as a consequence, the data is rendered undecodable. Transmitting the SCI beforehand in another TTI could solve this problem in some situation at the price of increasing latency and violating the principle of self-contained TTIs.

SUMMARY

Accordingly, there is a need for a radio communication technique that enables a sidelink between mobile devices. An alternative or further object is a technique for resource-efficient and/or low-latency radio communication on a sidelink between mobile devices. An alternative or more specific object is a radio communication technique that enables self-contained TTIs on a sidelink between mobile devices.

As to a first method aspect, a method of receiving a sequence of symbols on a sidelink (SL) in a transmission time interval (TTI) is provided. The method may comprise or initiate a step of performing an automatic gain control (AGC) for the SL based on at least one first symbol of the SL in the TTI. The method further may comprise or initiate a step of receiving, based on the AGC, SL control information (SCI) encoded in at least one second symbol of the SL in the TTI. The method may further comprise or initiate a step of receiving, based on the SCI, data encoded in at least one third symbol of the SL in the TTI.

By transmitting in the at least one first symbol reference signals and/or data, the radio resources of a sidelink can be used more efficiently by at least some embodiments. For example, a receiving mobile device can opportunistically improve coherent demodulation using the reference signals in the at least one first symbol. Alternatively or in addition, the receiving mobile device can opportunistically decode further data or improve the reliability of data reception based on the data (e.g., further data or redundant data) encoded in the at least one first symbol.

In same or further embodiments, the AGC symbol in the TTI can enable a self-contained transmission, so that the receiving mobile device is able to adjust its reception gain for the particular TTI and the particular SL from the transmitting mobile device.

Same of further embodiments may enable using the at least one first symbol as an AGC settling symbol that opportunistically carries useful information for a control channel and/or a data channel of the SL, e.g., in case the AGC settling symbol is not completely lost due to the AGC process at a receiver.

Each of the symbols of the SL in the TTI may be an orthogonal frequency-division multiplexing (OFDM) symbol.

The method may be performed by a receiving mobile device. The SL may be a direct radio link between a transmitting mobile device and the receiving mobile device. Any of the transmitting and/or receiving mobile devices may be a user equipment (UE), e.g., according to the Third Generation Partnership Project (3GPP).

The TTI may be a slot or a subframe, e.g., in a radio frame structure of the SL.

The sequence of symbols may be transmitted on the SL from a transmitting mobile device to a receiving mobile device within the TTI.

A gain resulting from the AGC may be applied to both the control channel and the shared channel.

The AGC may be based on received power of the at least one first symbol on the SL. The received power may be a reference signal received power (RSRP).

The at least one first symbol of the SL may be received prior to the reception of the at least one second symbol of the SL in the TTI. Alternatively or in addition, the at least one second symbol of the SL may be received prior to the reception of the at least one third symbol of the SL in the TTI.

The at least one first symbol may define the beginning of the TTI. Alternatively or in addition, the at least one third symbol may define the end of the TTI.

The at least one first symbol of the SL and the at least one second symbol of the SL may be consecutive in the TTI. Alternatively or in addition, the at least one second symbol of the SL and the at least one third symbol of the SL are consecutive in the TTI.

The at least one first symbol may comprise at least one reference signal. This may be particularly implemented in any embodiment referred to as the second or fourth embodiment herein. The reference signal or each of more than one reference signal may be a demodulation reference signal (DMRS), e.g., for coherently demodulating one or more spatial streams, respectively.

Receiving the SCI may comprise or initiate a step of demodulating the at least one second symbol using the at least one reference signal in the at least one first symbol. This may be particularly implemented in an embodiment referred to as the fourth embodiment herein.

The at least one reference signal in the at least one first symbol may be used in addition to further reference signals included in the at least one second symbol for demodulating the at least one second symbol. The at least one reference signal in the at least one first symbol may be used opportunistically. For example, the at least one first symbol may be used for either AGC setting (if the AGC setting has to be changed) or for additional reference signals.

The at least one reference signal in the at least one first symbol may support demodulating the at least one second symbol. The at least one second symbol may be coherently demodulated based on the at least one reference signal in the at least one first symbol and further reference signals in the TTI.

The step of performing the AGC may comprise and/or may be based on measuring a received power of the at least one first symbol at a mobile device receiving the SL. This may be particularly implemented in an embodiment referred to as the fourth embodiment herein. The received power may be the RSRP.

Data may be encoded in the at least one first symbol. This may be particularly implemented in any embodiment referred to as the first, second or third embodiment herein. The method may further comprise or initiate the step of demodulating and/or decoding the data encoded in the at least one first symbol.

The data and the at least one reference signal in the at least one first symbol may be frequency-multiplexed in the at least one first symbol. Preferably, each of the data and the reference signal may be arranged according to a comb-like allocation of subcarriers in the at least one first symbol.

The comb-like allocation of subcarriers in the at least one first symbol may leave every second subcarrier empty. Alternatively or in addition, the at least one reference signal, e.g. a DMRS, may be fed into every n active subcarriers, wherein n is a positive integer larger than or equal to 2. For example, DMRS may be fed into every second or every third active subcarrier of the at least one first symbol.

Receiving the data encoded in the at least one first symbol may comprise or initiate demodulating the at least one first symbol based on the at least one reference signal included in the at least one first symbol. This may be particularly implemented in any embodiment referred to as the second embodiment herein.

Optionally, the at least one first symbol may be transmitted on the same antenna port as the at least one second symbol and/or the at least one third symbol. For example, the data encoded in the at least one first symbol and the SCI encoded in the at least one second symbol and/or the data encoded in the at least one third symbol may be coherently demodulated based on reference signals included in the at least one first symbol and the second and/or third symbols.

Receiving the data encoded in the at least one first symbol may comprise or initiate a step of demodulating the at least one first symbol based on reference signals included in the at least one second symbol. This may be particularly implemented in any embodiment referred to as the first embodiment herein. The at least one first symbol and the at least one second symbol may be transmitted on the same antenna port.

The reference signals included in the at least one second symbol may comprise one or more DMRS.

Receiving the data encoded in the at least one first symbol may comprise or initiate a step of demodulating the at least one first symbol based on reference signals included in the at least one third symbol, if a coherence condition for the TTI is fulfilled. This may be particularly implemented in any embodiment referred to as the third embodiment herein. The coherence condition may be fulfilled if a velocity of a mobile device receiving the SL is less than an absolute velocity threshold, if a relative velocity between the receiving mobile device and a mobile device transmitting the SL is less than a relative velocity threshold, and/or if a rate of change of a channel state or channel estimate is less than a rate threshold.

The at least one first symbol and the at least one third symbol may be transmitted on the same antenna port. The demodulation of the at least one first symbol may be selectively based on reference signals included in the at least one third symbol, if the coherence condition is fulfilled.

The channel state may be measured at the receiving mobile device and/or reported to the transmitting mobile device. For example, the receiving mobile terminal may estimate the channel state based on reference signals included in the at least one first symbol. Alternatively or in addition, the transmitting mobile device may measure the channel state (e.g., based on channel reciprocity). For example, the transmitting mobile device may estimate the channel state based on reference signals transmitted from receiving mobile, if the channel underlying the SL is reciprocal.

Any of the steps of demodulating based on any of the at least one reference signal may comprise performing a channel estimation based on the respective at least one reference signal and demodulating using the channel estimation.

The at least one first symbol of the SL in the TTI may be encoded redundantly to the data encoded in the at least one third symbol of the SL in the TTI. This may be particularly implemented in any embodiment referred to as the first, second or third embodiment herein.

The at least one first symbol may be encoded with data that is redundant to the data encoded in at least one third symbol of the SL in the TTI. The data encoded in the at least one first symbol may provide for a forward error correction (FEC). The at least one first symbol and the at least one third symbol may be encoded according to a codeword resulting from a redundant code, e.g., an error-correcting code (ECC).

Based on the SCI, the receiving mobile device may determine (e.g., on the physical layer) whether or not the data on the SL in the TTI (or a corresponding data packet) is addressed to the receiving mobile device. Alternatively or in addition, the receiving mobile device may deduce the information necessary to demodulate the data.

The SCI may be indicative of whether or not the at least one first symbol comprises data. The receiving mobile device may be configured to selectively perform any one of the first, second and third embodiments in response to the SCI indicating that the at least one first symbol comprises data.

Alternatively or in addition, the SCI may be indicative of whether the data encoded in the at least one first symbol is transmitted on an antenna port corresponding to reference signals included in the first, second or third symbols. The receiving mobile device may be configured to selectively perform the first, second or third embodiment according to the indication.

The reference signals included in the first, second or third symbols may comprise one or more DMRS.

Alternatively or in addition, the SCI may be indicative of a modulation scheme and/or a coding scheme. The method may further comprise or initiate a step of decoding at least one of the data encoded in the at least one first symbol and the data encoded in the at least one third symbol according to the modulation scheme and/or the coding scheme. The step of decoding may start after receiving the SCI and/or before the end of the TTI.

The SCI may provide at least one of the following pieces of information. The SCI may comprise a frequency hopping flag. The SCI may be indicative of whether frequency hopping is applied for the at least one first symbol and/or third symbol. The SCI may be indicative of a resource block assignment. The SCI may provide information about a number of allocated resource blocks (RBs) and/or their location (e.g., in time and/or frequency). The SCI may be indicative of a number of the at least one first symbol and/or a number of the at least one third symbol. The SCI may be indicative of a modulation and coding scheme (MCS). The SCI may be indicative of a timing advance, i.e., a timing adjustment value for the receiving mobile device.

The SL may comprise a radio channel from the transmitting mobile device to the receiving mobile device. The first method aspect may be performed by or at the receiving mobile device.

The at least one second symbol may be allocated to a physical SL control channel (PSCCH). The at least one third symbol may be allocated to a physical SL shared channel (PSSCH).

The at least one first symbol may be allocated to a physical SL broadcast channel (PSBCH).

As to a second method aspect, a method of transmitting a sequence of symbols on a sidelink (SL) in a transmission time interval (TTI) is provided. The method comprises or initiates a step of transmitting at least one first symbol of the SL in the TTI as a basis for performing an automatic gain control (AGC) for the SL. The method further comprises or initiates a step of transmitting, after the transmission of the at least one first symbol, SL control information (SCI) encoded in at least one second symbol of the SL in the TTI. The method further comprises or initiates a step of transmitting, according to the SCI, data encoded in at least one third symbol of the SL in the TTI.

The second method aspect may further comprise or initiate any of the steps and/or any of the features disclosed in the context of the first method aspect, or steps and/or features corresponding thereto.

As to a signal aspect, a signal structure comprising a sequence of symbols on a sidelink (SL) in a transmission time interval (TTI) is provided. The signal structure comprises at least one first symbol of the SL in the TTI as a basis for performing an automatic gain control (AGC) for the SL. The signal structure further comprises, in the TTI after the at least one first symbol, at least one second symbol encoded with sidelink control information (SCI). The signal structure further comprises, in the TTI after the at least one second symbol, at least one third symbol encoded with data according to the SCI.

The signal structure may be transmitted on the SL from the transmitting mobile device to the receiving mobile device within the TTI. The at least one first symbol may enable performing the AGC at the receiving mobile device of the SL. Based on the AGC, the receiving mobile device may receive the SCI and, furthermore, the data according to the SCI.

Each of the symbols may be defined by a set of Fourier components respectively corresponding to resource elements (REs) or subcarriers. The signal structure may be implemented as an arrangement of REs carrying the symbols in at least one of frequency and time. Alternatively or in addition, the signal structure may be implemented as an arrangement of (e.g., coherent) photons in at least one of space and time.

Further data and/or redundant data may be encoded in the at least one first symbol. This may be particularly implemented in any embodiment referred to as the first, second or third embodiment herein. The further data may be encoded in addition to the data encoded in the at least one third symbol. Alternatively or in addition, the data encoded in the at least one may be redundant to the data encoded in the at least one third symbol.

The at least one first symbol may comprise at least one reference signal. This may be particularly implemented in any embodiment referred to as the second or fourth embodiment herein.

The symbols in the sequence may be at least one of consecutive and not overlapping in time. The symbols in the sequence may be contiguous in the TTI.

The signal structure may further comprise any feature disclosed in the context of the first or second method aspect, or a feature corresponding thereto.

The TTI may be a subframe or slot of a radio frame structure. The SL may comprise or serve, e.g., according to 3GPP, at least one of vehicle-to-vehicle (V2V) communication, vehicle-to-infrastructure (V2I) communication, vehicle-to-pedestrian (V2P) communication, vehicle-to-everything (V2X) communication (which may comprise at least one of V2V, V2I and V2P communication), and device-to-device communication (D2D).

Different reference signals may be received from different antenna ports of the transmitting mobile device, e.g., for a multiple-input or beamforming SL. Alternatively or in addition, each reference signal may be received at multiple antenna ports of the receiving mobile device, e.g., for a multiple-input multiple-output (MIMO) SL.

The technique may be implemented at one or more mobile devices, e.g., connectable to a radio access network (RAN) configured to serve the one or more mobile devices.

Any of the mobile devices may be configured for peer-to-peer communication on the SL) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions or instructions for performing any one of the steps of the first method aspect and/or the second method aspect disclosed herein when the computer program product is executed by one or more computing devices. The computer program product may be stored on a computer-readable recording medium. The computer program product may also be provided for download via a data network, e.g., via the ad hoc network, the RAN, the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for receiving a sequence of symbols on a sidelink (SL) in a transmission time interval (TTI) is provided. The device comprises an AGC unit configured to performing an automatic gain control (AGC) for the SL based on at least one first symbol of the SL in the TTI. The device further comprises a control information receiving unit configured to receive, based on the AGC, SL control information (SCI) encoded in at least one second symbol of the SL in the TTI. The device further comprises a data receiving unit configured to receive, based on the SCI, data encoded in at least one third symbol of the SL in the TTI.

The device, e.g., any one of the units or a dedicated unit, may be further configured to perform any of the steps disclosed in the context of another aspect, particularly the first method aspect, or may comprise any feature disclosed in the context of another aspect, particularly the first method aspect.

As to a second device aspect, a device for transmitting a sequence of symbols on a sidelink (SL) in a transmission time interval (TTI) is provided. The device comprises an AGC transmitting unit configured to transmit at least one first symbol of the SL in the TTI as a basis for performing an automatic gain control (AGC) for the SL. The device further comprises a control information transmitting unit configured to transmit, after the transmission of the at least one first symbol, SL control information (SCI) encoded in at least one second symbol of the SL in the TTI. The further device comprises a data transmitting unit configured to transmit, according to the SCI, data encoded in at least one third symbol of the SL in the TTI.

The device, e.g., any one of the units or a dedicated unit, may be further configured to perform any of the steps disclosed in the context of another aspect, particularly the second method aspect, or may comprise any feature disclosed in the context of another aspect, particularly the second method aspect.

As to a further first device aspect, a device for receiving a sequence of symbols on a sidelink (SL) in a transmission time interval (TTI) is provided. The device comprises at least one processor and a memory. Said memory comprises instructions executable by said at least one processor, whereby the device is operative to perform an automatic gain control (AGC) for the SL based on at least one first symbol of the SL in the TTI. Execution of the instructions further causes the device to be operative to receive, based on the AGC, SL control information (SCI) encoded in at least one second symbol of the SL in the TTI. Execution of the instructions further causes the device to be operative to receive, based on the SCI, data encoded in at least one third symbol of the SL in the TTI.

As to a further second device aspect, a device for transmitting a sequence of symbols on a sidelink (SL) in a transmission time interval (TTI) is provided. The device comprise at least one processor and a memory. Said memory comprises instructions executable by said at least one processor, whereby the device is operative to transmit at least one first symbol of the SL in the TTI as a basis for performing an automatic gain control (AGC) for the SL. Execution of the instructions further causes the device to be operative to transmit, after the transmission of the at least one first symbol, SL control information (SCI) encoded in at least one second symbol of the SL in the TTI.

Execution of the instructions further causes the device to be operative to transmit, according to the SCI, data encoded in at least one third symbol of the SL in the TTI.

As to a still further aspect, a user equipment (UE) configured to communicate with a base station is provided.

The UE comprises a radio interface and processing circuitry configured to execute the any one of the steps of the method aspect.

As to a still further aspect, a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry, the processing circuitry of the UE being configured to execute any one of the steps of the first and/or second method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect, a method implemented in a user equipment (UE) is provided. The method may comprise any of the steps of the first and/or second method aspect.

The device, the UE, the system or any node or station for embodying the technique may further include any feature disclosed in the context of the first method aspect and/or the second method aspect, and vice versa. Particularly, any one of the units and modules, or a dedicated unit or module, may be configured to perform or trigger one or more of the steps of any one of the first method aspect and/or the second method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
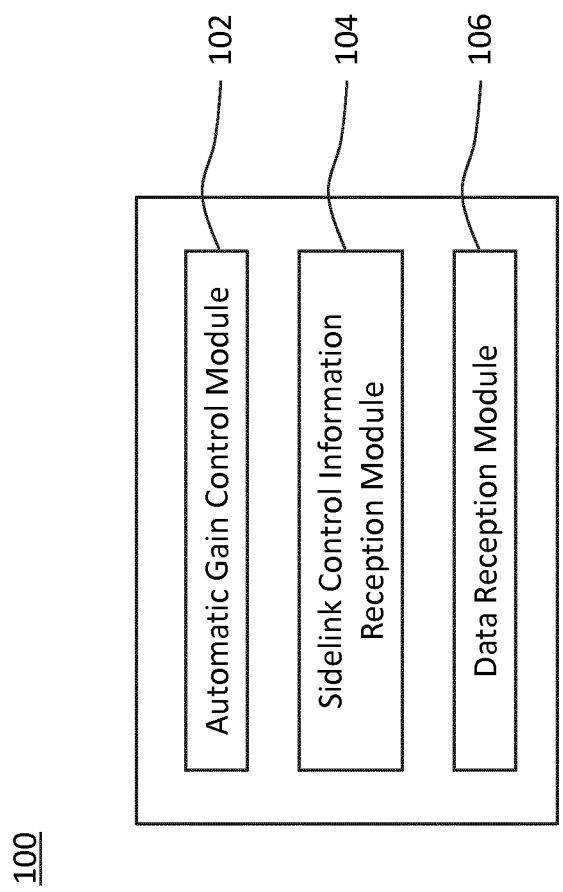
FIG. 1 shows a schematic block diagram of a device embodiment for receiving a sequence of symbols on a sidelink in a transmission time interval.

FIG. 1 schematically illustrates a block diagram of a device for receiving a sequence of symbols on a sidelink (SL) in a transmission time interval (TTI). Reference sign 100 generically refers to such a device.

The device 100 comprises an automatic gain control (AGC) module 102 that performs or initiates an AGC for the SL based on at least one first symbol of the SL in the TTI. The device 100 further comprises a sidelink control information (SCI) reception module 104 that receives SCI encoded in at least one second symbol of the SL in the TTI based on the AGC. The device 100 further comprises a data reception module 106 that receives, based on the SCI, data encoded in at least one third symbol of the SL in the TTI.

Any of the modules of the device 100 may be implemented by units configured to provide the corresponding functionality.

Figure 2:
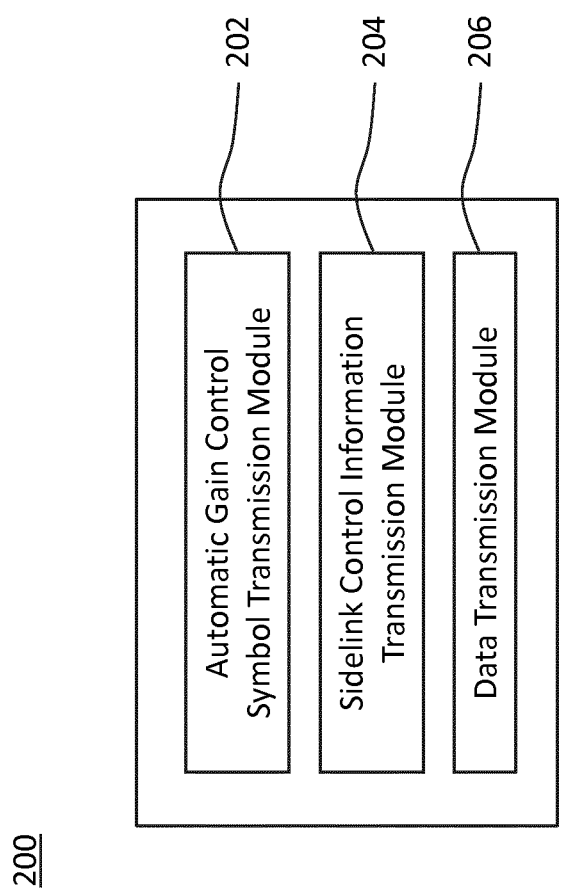
FIG. 2 shows a schematic block diagram of a device embodiment for transmitting a sequence of symbols on a sidelink in a transmission time interval.

FIG. 2 schematically illustrates a block diagram of a device for transmitting a sequence of symbols on a sidelink (SL) in a transmission time interval (TTI). Reference sign 200 generically refers to such a device.

The device 200 comprises an automatic gain control symbol transmission module 202 that transmits at least one first symbol of the SL in the TTI as a basis for performing an automatic gain control (AGC) for the SL. The device 200 further comprises a sidelink control information transmission module 204 that transmits, after the transmission of the at least one first symbol, sidelink control information (SCI) encoded in at least one second symbol of the SL in the TTI. The device 200 further comprises a data transmission module 206 that transmits, according to the SCI, data encoded in at least one third symbol of the SL in the TTI.

Any of the modules of the device 200 may be implemented by units configured to provide the corresponding functionality.

The device 100 may be implemented by a receiving mobile device, e.g., a receiving terminal of the SL. Alternatively or in addition, the device 200 may be implemented by a transmitting mobile device, e.g., a transmitting terminal of the SL.

In any aspect, the device 100 may be wirelessly connected or connectable to the device 200, and/or vice versa, for example for vehicle-to-vehicle (V2V) communications or any vehicular (V2X) communications. V2X communications are also referred to as vehicle-to-everything communications. Any of the devices 100 and 200 may be embodied by or at a radio device configured for wireless ad hoc connections via the SL.

Optionally, any of the devices 100 and 200 may be wirelessly connected or connectable to a radio access network (RAN), e.g., to a base station of the RAN. Any of the devices 100 and 200 may be embodied by or at a radio device configured for accessing the RAN, for example in a vehicle configured for radio-connected driving. The base station may encompass a network controller (e.g., a Wi-Fi access point) or a radio access node (e.g. a 3G Node B, a 4G eNodeB or a 5G gNodeB) of the RAN. The base station may be configured to provide radio access.

Alternatively or in addition, any of the devices 100 and 200 may include a mobile or portable station or a radio device connectable to the RAN. Any of the devices 100 and 200 may be a user equipment (UE), particularly a device for machine-type communication (MTC) and/or a device for (e.g., narrowband) Internet of Things (IoT).

Figure 3:
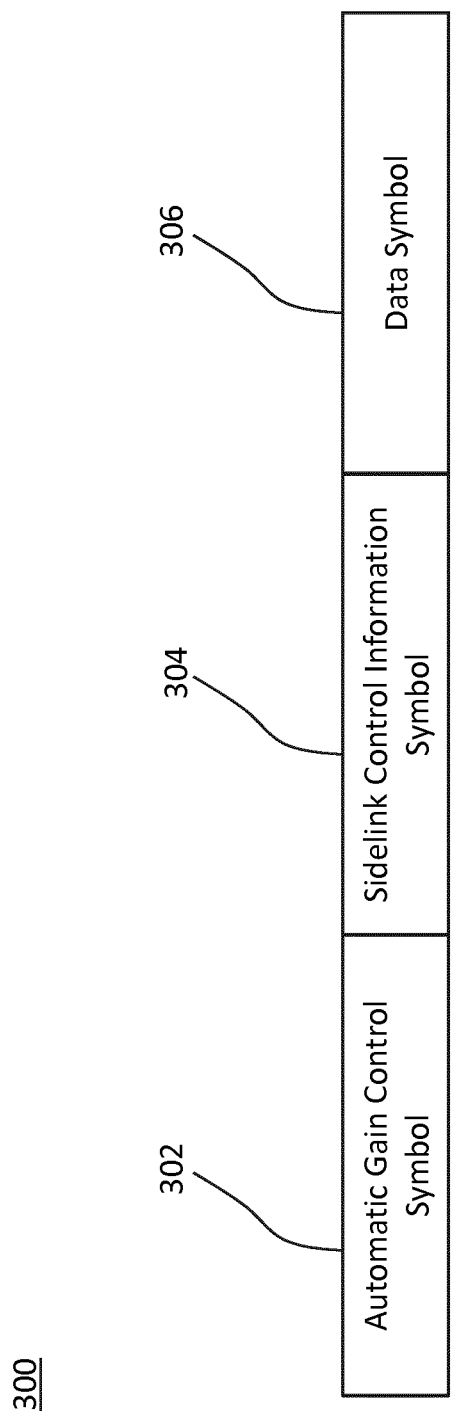
FIG. 3 schematically illustrates a signal structure embodiment comprising a sequence of symbols on a sidelink in a transmission time interval.

FIG. 3 schematically illustrates an embodiment of a signal structure comprising a sequence of symbols on a sidelink (SL) in a transmission time interval (TTI). The signal structure is generically referred to by reference sign 300.

The signal structure 300 comprises at least one first symbol 302 of the SL in the TTI as a basis for performing an automatic gain control (AGC) for the SL. The at least one first symbol 302 may also be referred to as AGC symbol 302 or AGC settling symbol 302.

The signal structure 300 further comprises, in the TTI after the at least one first symbol 302, at least one second symbol 304 encoded with sidelink control information (SCI). The at least one second symbol 304 may also be referred to as SCI symbol 304.

In the TTI after the at least one second symbol 304, the signal structure 300 comprises at least one third symbol 306 encoded with data according to the SCI. The at least one third symbol 306 may also be referred to as data symbol 306.

The at least one second (or SCI) symbol may be allocated to a physical sidelink control channel (PSCCH) of the SL. The at least one second symbol may also be referred to as PSCCH symbol 304 or, briefly, PSCCH 304.

The at least one third (or data) symbol may be allocated to a physical sidelink shared channel (PSSCH) of the SL. The at least one third symbol may also be referred to as PSSCH symbol 306 or, briefly, PSSCH 306.

Optionally, the at least one first (or AGC) symbol 302 is a further symbol allocated to the PSSCH of the SL. In this case, the at least one first symbol may also be referred to as opportunistic PSSCH symbol 302.

A complete transmission of a data packet on the SL may comprise the transmissions of two physical channels, namely the PSCCH and the PSSCH. The PSCCH carries SCI to enable the decoding of the PSSCH, which carries the actual data. Specifically, the SCI in the PSCCH comprises information about the radio resources (e.g., in terms of time or symbols, frequency or subcarriers, and/or spatial streams or filtering) in which the PSSCH 306 is transmitted and/or information of how the PSSCH 306 is encoded (e.g., the modulation and coding scheme, MCS).

The receiving device 100 may first decode the PSCCH 304, which may be encoded using a pre-defined format. Based on the control information received in the PSCCH 304, the receiving device 100 then decodes the associated PSSCH 306.

The signal structure 300 may be transmitted from the device 200, e.g., a transmitting mobile device of the SL. Alternatively or in addition, the signal structure 300 may be received at the device 100, e.g., a receiving mobile device of the SL.

Figure 4:
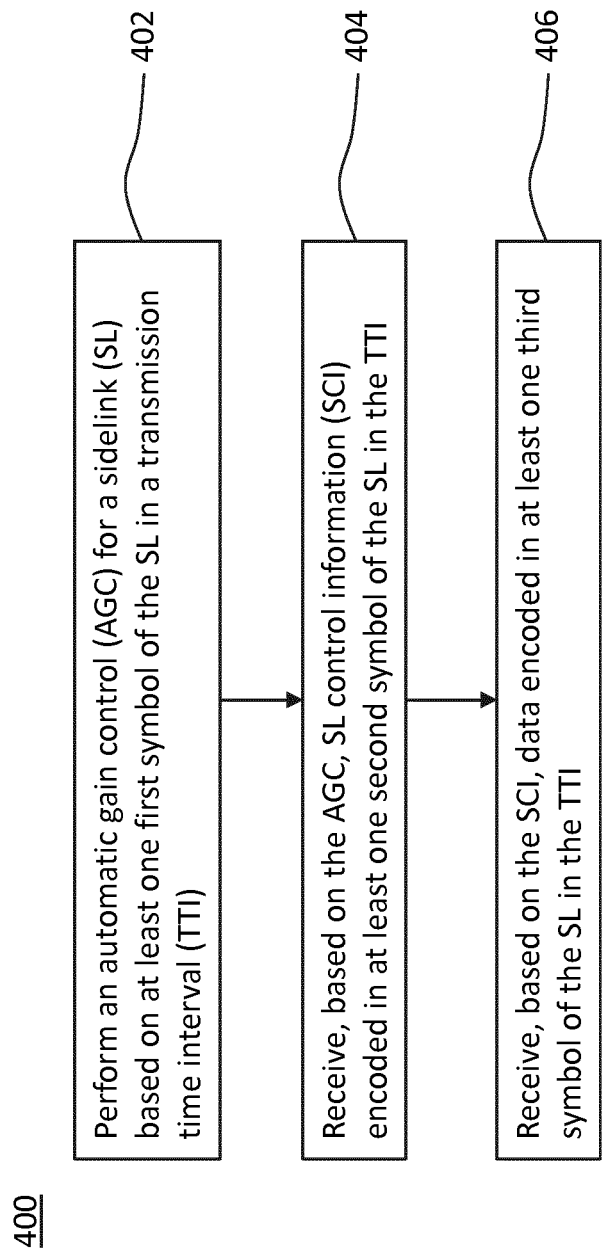
FIG. 4 shows a flowchart of a method embodiment for receiving a sequence of symbols on a sidelink in a transmission time interval, which method is implementable by the device of FIG. 1.

FIG. 4 shows a flowchart for a method 400 of receiving a sequence of symbols on a SL in a TTI. The method 400 comprises or initiates a step 402 of performing an AGC for the SL based on at least one first symbol of the SL in the TTI. Based on the AGC, SCI encoded in at least one second symbol of the SL in the TTI is received in a step 404 of the method 400. Based on the SCI, data encoded in at least one third symbol of the SL in the TTI is received in a step 406 of the method 400.

The method 400 may be performed by the device 100, e.g., at or using a receiving mobile device for accessing another radio device, e.g., the device 200. Particularly, the modules 102, 104 and 106 may perform the steps 402, 404 and 406, respectively.

Figure 5:
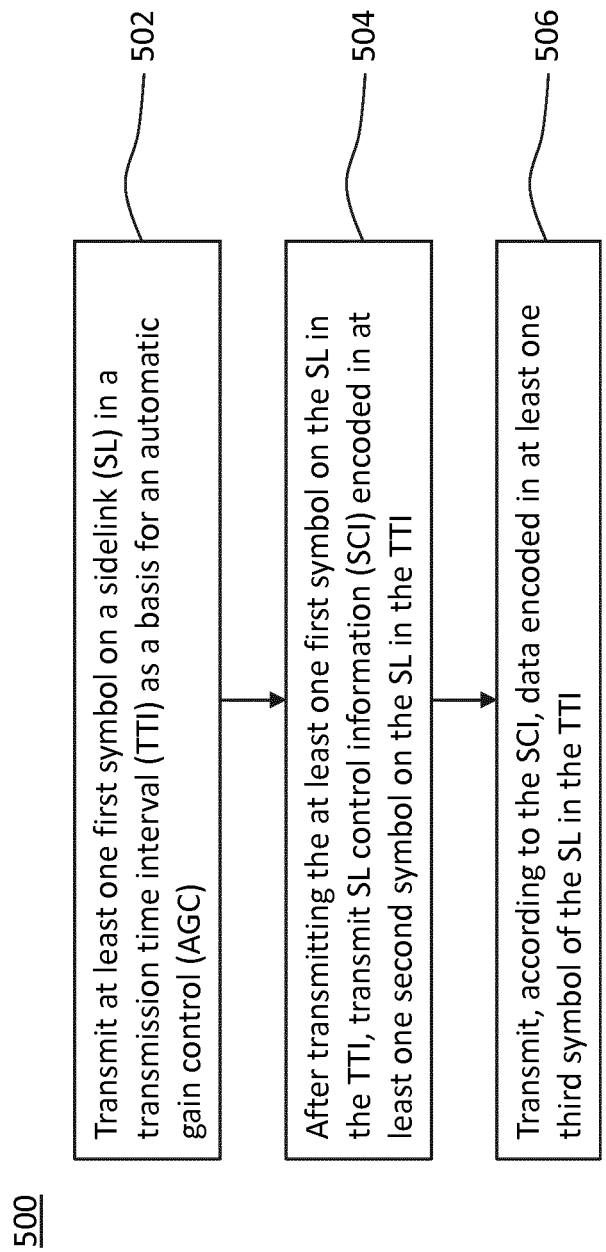
FIG. 5 shows a flowchart of a method embodiment for transmitting a sequence of symbols on a sidelink in a transmission time interval, which method is implementable by the device of FIG. 2.

FIG. 5 shows a flowchart for a method 500 of transmitting a sequence of symbols on a SL in a TTI. The method 500 comprises or initiates a step 502 of transmitting at least one first symbol of the SL in the TTI as a basis for performing an AGC for the SL. After the transmission of the at least one first symbol, SCI encoded in at least one second symbol of the SL in the TTI is transmitted in a step 504. In a step 506, data encoded in at least one third symbol of the SL in the TTI is transmitted according to the SCI.

The step 502 may enable and/or trigger AGC settling for the SL (e.g., D2D or V2X) transmissions in the step 504 and/or 506.

The method 500 may be performed by the device 200, e.g., at or using a transmitting mobile device for accessing another radio device, e.g., the device 100. Particularly, the modules 202, 204 and 206 may perform the steps 502, 504 and 506, respectively.

Furthermore, a signal resulting from the method 500 and/or a signal processed by the method 400 may be structured according to the signal structure 300. Particularly, the modules 202, 204 and 206 may generate and/or transmit the symbols 302, 304 and 306, respectively. The modules 102, 104 and 106 may receive and/or process the symbols 302, 304 and 306, respectively.

Embodiments of the device 100 and/or the device 200 may be configured for stand-alone radio communication, ad hoc radio networks and/or vehicular radio communications (V2X communications), particularly according to technical standard documents of the Third Generation Partnership Project (3GPP). In Release 12, the 3GPP standard for Long Term Evolution (LTE) had been extended with support of device-to-device (D2D) communications (also referred to as "sidelink" communications). D2D features (also referred to as Proximity Services, ProSe) are targeting both commercial and Public Safety applications. ProSe features enabled since 3GPP LTE Release 12 include device discovery, i.e., one radio device is able to sense the proximity of another radio device and associated application by broadcasting and detecting discovery messages that carry device and application identities. Further ProSe features are an example for features that enable direct communication based on physical channels terminated directly between devices 100 and 200. Such features are defined, inter alia, in the documents 3GPP TS 23.303, Version 15.0.0, and 3GPP TS 24.334, Version 15.1.0.

In 3GPP LTE Release 14, the D2D communications were further extended to support of V2X communications, which include any combination of direct communication between vehicles, pedestrians and infrastructure. While V2X communications may take advantage of a network infrastructure (e.g., a RAN) if available, at least basic V2X connectivity is possible even in case of lacking RAN coverage. Implementing V2X communications based on a 3GPP radio interface (e.g., according to LTE and/or NR) can be economically advantageous due to economies of scale. Furthermore, using or extending a 3GPP radio interface may enable a tighter integration between communications with the network infrastructure (V2I communications) and vehicular D2D communications (such as vehicle-to-pedestrian, V2P, and vehicle-to-vehicle, V2V, communications) as compared to using a dedicated communication technology.

The at least one first symbol 302 may also be referred to as the at least one AGC settling symbol. The at least one first symbol may be one symbol in the TTI, particularly the first symbol in the TTI. Any or each of the first, second and third symbols may be an orthogonal frequency-division multiplexing (OFDM) symbol.

The technique may be implemented for efficient use of the at least one first symbol 302, i.e., for efficient use of the at least one AGC settling symbol 302 (e.g., the first OFDM symbol in the TTI). The efficient use may be implemented according to one or more of the following four embodiments.

In a first embodiment, the AGC settling symbol 302 carries data for the PSSCH, e.g., further data or data that is encoded redundantly to the data encoded in the data symbols 306. The AGC settling symbol 302 is transmitted using the same antenna port as the PSCCH, i.e., the antenna port used for transmitting the SCI symbols 304 from the device 200. Hence, the DMRSs of the SCI symbols 304 (i.e., the DMRSs in the PSCCH) are used for the demodulation of the AGC settling symbol 302. Since the SCI symbols 304 are closer to the AGC settling symbol 302 in the time domain, as compared to the data symbols 306, the DMRSs of the PSCCH improves the demodulation as compared to a demodulation based on the DMRSs of the PSSCH.

In a second embodiment, the AGC settling symbol 302 carries data for the PSSCH and has its own one or more DMRSs. For example, the AGC settling symbol 302 may comprise a code word or a portion of a code word encoding the data that is also encoded in the data symbols 306. In the AGC settling symbol 302, the data (i.e., the encoded data) and the one or more DMRSs are in the same symbol at different subcarriers.

In a third embodiment, the AGC settling symbol 302 carries data for the PSSCH and is transmitted using the same antenna port as the PSSCH, if or when the transmitter (e.g., the device 200) measures or expects slow changes in the channel condition for the SL. Herein, "slow" may relate to changes that allow the receiver (e.g., the device 100) to use the same AGC setting over one or more TTIs. The DMRSs of the PSSCH (i.e., the DMRSs in the data symbols 306) are used for the demodulation of the AGC settling symbol 302. Preferably, the DMRSs in the data symbols 306 are also used for the demodulation of the PSCCH, i.e., of the SCI symbols 304, if the same antenna port is used.

In a fourth embodiment, the AGC settling symbol 302 carries one or more DMRSs only. The one or more DMRSs in the AGC settling symbol 302 is opportunistically used for the demodulation of the PSCCH, i.e., for demodulating the SCI symbols 304. Optionally, the one or more DMRSs in the AGC settling symbol 302 is opportunistically used also for the demodulation of the PSSCH, i.e., for demodulating the data symbols 306.

Any of the embodiments may be realized by the receiving device 100, the transmitting device 200, the signal structure 300, the receiving method 400 and/or the transmitting method 500. Furthermore, the technique may be implemented as a method of signaling in an AGC settling symbol for SL communications.

Figure 6:
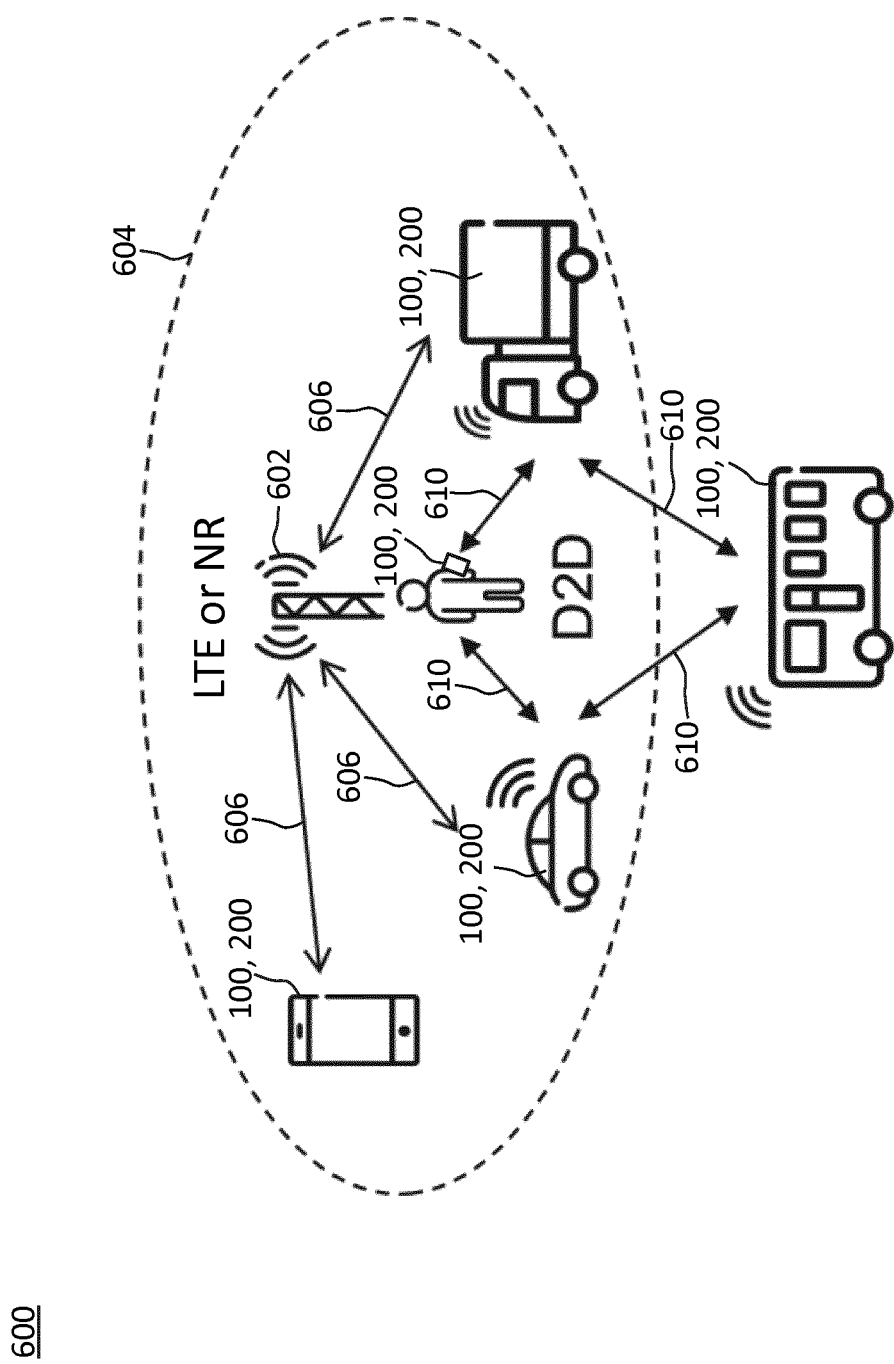
FIG. 6 schematically illustrates an exemplary network environment for implementing any of the devices of FIGS. 1 and 2 and the signal structure of FIG. 3.

FIG. 6 schematically illustrates an exemplary radio environment 600 for implementing the technique. Optionally, the radio environment 600 comprises a network infrastructure, e.g., a RAN, including at least one base station 602 providing radio access within a cell 604. Thus, the radio environment 600 optionally comprises vehicle-to-everything (V2X) communications 606 with the network infrastructure and/or scheduled by the network infrastructure.

Alternatively or in combination, the radio environment 600 includes direct V2X communications 610, e.g., without the need for or without the involvement of a network infrastructure, particularly direct V2V communications and/or direct V2P communications. These direct communication functionalities are built upon LTE D2D (device-to-device), also known as ProSe (Proximity Services), as first specified in the Release 12 of LTE, and include many important enhancements targeting the specific characteristics of vehicular communications. For example, LTE V2X operation is possible with and without network coverage and with varying degrees of interaction between the UEs and the RAN, including support for standalone (i.e., network-less) operation.

Any radio communication, e.g., any of the V2X communications 606 or 610, may be associated with specific sets of requirements, e.g., in terms of latency, reliability, capacity and/or Quality of Service. By way of example, the European Telecommunications Standards Institute (ETSI) has defined two types of messages for road safety, including a Cooperative Awareness Message (CAM) and a Decentralized Environmental Notification Message (DENM).

The CAM message enables vehicles, including emergency vehicles, to notify their presence and other relevant parameters in a broadcast fashion. Such messages target other vehicles, pedestrians and infrastructure, and are handled by their applications. CAM message also serves as an active assistance to safety driving for normal traffic. Conventionally, the availability of a CAM message is indicatively checked for every 100 ms, yielding a maximum detection latency requirement of on the order of (e.g., a maximum latency of) 100 ms for most messages.

A latency requirement for a warning message triggered by or for pre-crash sensing may be 50 ms, which can be fulfilled by embodiments of the technique, e.g., by a self-contained transmission. The self-contained transmission may include in the TTI a widebeam reception of the AGC settling symbol 302 (optionally including reference signals) and the SCI symbols 304 (including reference signals) followed by a transmission and/or a reception of data encoded in the data symbols 306 in accordance with the SCI received in the SCI symbols 304.

The DENM message may be triggered by an event, e.g., by braking the vehicle hosting an embodiment of the device 100 and/or 200. An embodiment of the device 100 may check the availability of a DENM message for every 100 ms or less.

CAM messages and DENM messages are supposed to be detected by all vehicles in proximity, which can be achieved by implementing an embodiment of the device 200 in vehicles, e.g., for a broadcast transmission and/or a widebeam transmission in the steps 502, 504 and/or 506.

Alternatively or in addition, embodiments of the device 100 and the device 200 may be configured for multi-antenna radio reception and transmission, respectively, using multiple-input multiple-output (MIMO) radio channels and/or performing beamforming or spatial filtering in radio receptions and transmissions, respectively.

V2X communications support one transmitting (Tx) antenna and two receiving (Rx) antennas since 3GPP LTE Release 14. The number of antennas can be increased to enhance reliability and data rate, e.g., according to 3GPP LTE V2X Release 15.

The technique is applicable for any number of antenna ports per device 100 and 200.

Most of the transmissions in LTE sidelink (including D2D or ProSe and V2X) may be broadcast transmissions, at least from the point of view of the physical layer (PHY). This means that all embodiments of the receiving device 100 in the proximity of an embodiment of the transmitting device 200 pick up the signal structure 300. Each of the embodiments of the receiving device 100 in the proximity of the transmitting device 200 may perform an individual AGC.

Figure 17:
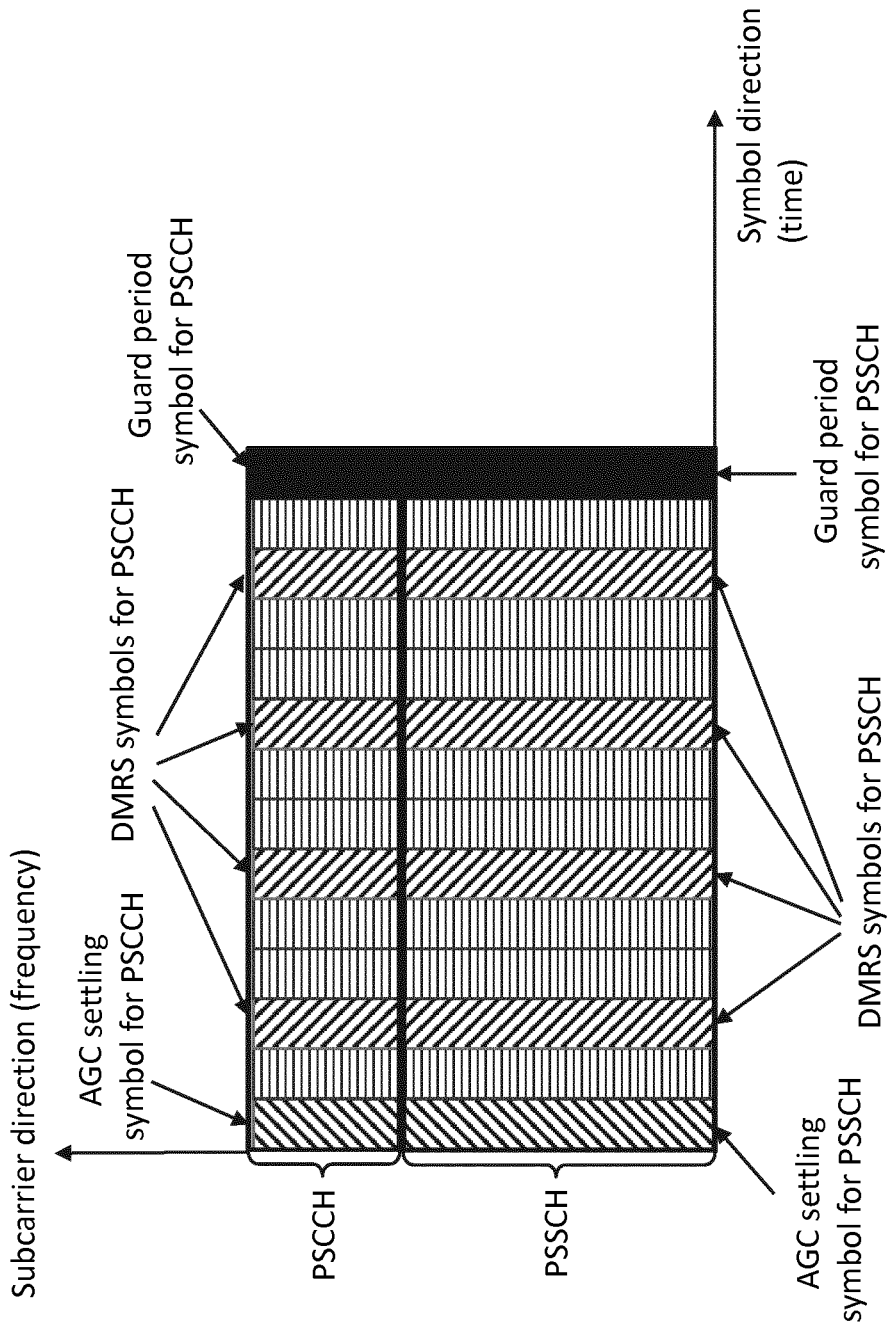
FIG. 17 illustrates a conventional signal structure.

In contrast to the signal structure 300, due to this broadcast nature, there has been no power control mechanism in the conventional LTE SL. As a result, the signal strength at a receiver can vary significantly from one TTI to another TTI. The reason is that the devices are moving, creating rapid changes in the signal and interference condition. Therefore, there is a need to adjust the dynamic range of the receiver before receiving a transmission. D2D according to 3GPP Releases 12 and/or 13 as well as V2X according to Releases 14 and/or 15 assume that a receiver will use the first symbol in a 14-symbol subframe to adjust its AGC. This symbol is commonly referred to as the AGC settling symbol. In conventional LTE SL, this symbol contains information bits (i.e., it is part of PSCCH or PSSCH, depending on the case, e.g., as illustrated in FIG. 17). However, the decoding requirements are defined under the assumption that the AGC settling symbol may not be available for decoding purposes.

If the received signal strength does not vary a lot from one TTI to another TTI, the receiving device 100 effectively does not need to re-adjust its AGC setting and, therefore, can start decoding the at least one first symbol 302 in the TTI. As a result, at least some embodiments can opportunistically use the AGC settling symbol 302 (which may carry data and/or reference signals) whenever the AGC settling symbol 302 is not lost due to performing the AGC in the step 402. For example, the receiving device 100 demodulates and/or decodes the AGC settling symbol 302, which may be used as any other data symbol 306 later in the TTI. Soft-bits resulting from demodulating the AGC settling symbol 302 and soft-bits resulting from demodulating the data symbols 306 may be decoded as a single code block, e.g., to improve forward error correction and, thus, reduce a block error rate.

Figure 7:
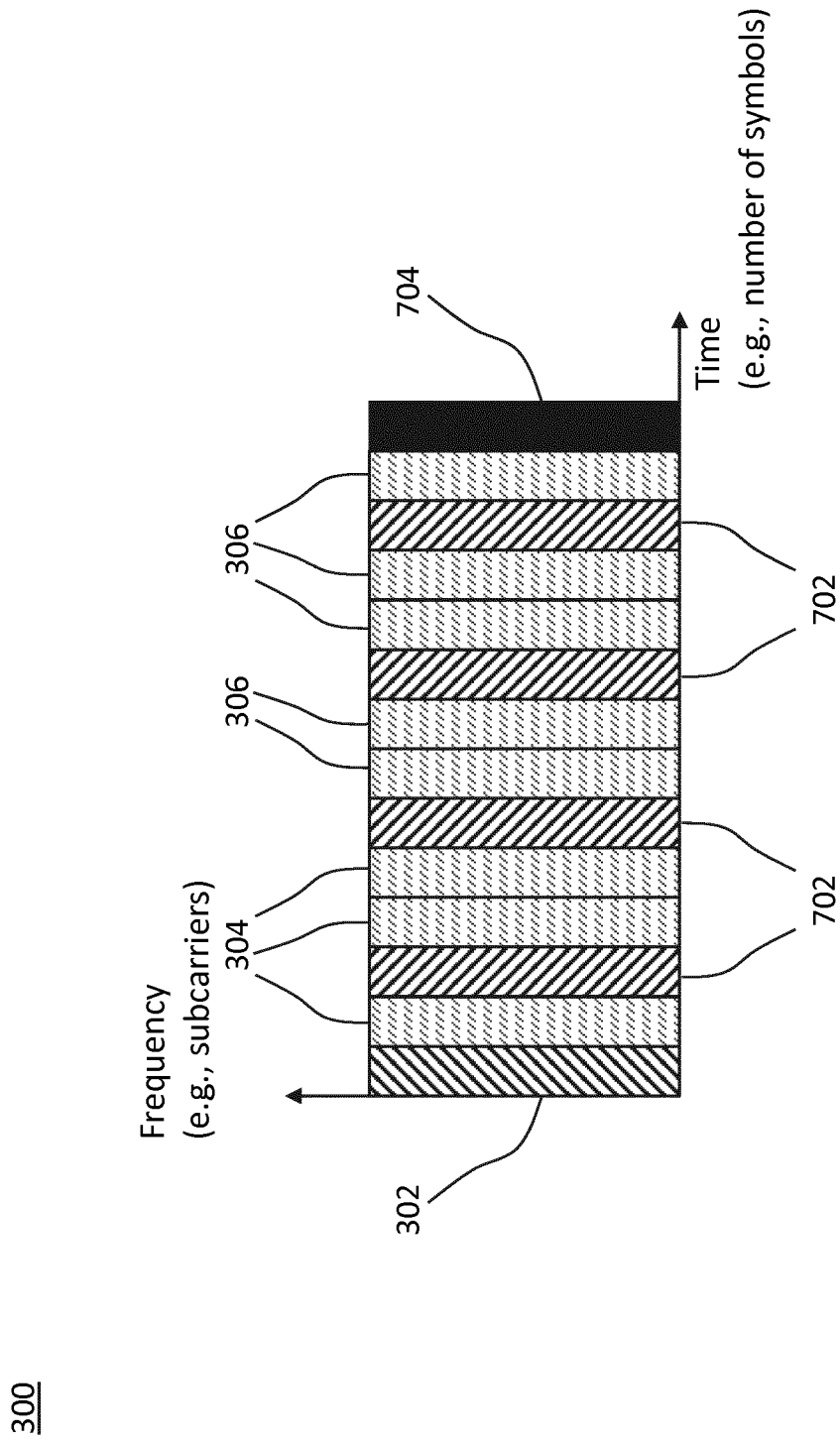
FIG. 7 shows a schematic time-frequency grid for an implementation of the signal structure embodiment of FIG. 3.

FIG. 7 shows a schematic time-frequency grid for an embodiment of the signal structure 300. The first symbol 302 of the signal structure 300 is used for AGC settling.

The AGC settling symbol 302 comprises opportunistic information, e.g., reference signals and/or data. Reception of the opportunistic information is facultative and/or advantageous for the receiving device 100. For example, the data encoded in the AGC settling symbol 302 may be redundant to the data encoded in the data symbols 306.

The number of AGC settling symbols 302 may be less than the number of SCI symbols 304. The number of SCI symbols 304 may be less than the number of data symbols 306.

Optionally, DMRS symbols 702 are arranged between the symbols 302 and 304 and/or between the symbols 304 and 306 in the signal structure 300. Alternatively or in addition, DMRS symbols 702 are arranged between at least some of the SCI symbols 304 and/or between at least some of the data symbols 306 in the signal structure 300.

In a variant, the SCI symbols 304 and/or the data symbols 306 comprise DMRSs distributed in both time and frequency (e.g., without symbols dedicated to DMRS). In other words, the DMRS 702 may be (e.g., exclusively) included in symbols 304 and/or 306 carrying SCI and data, respectively.

Optionally, the signal structure 300 comprises at the end of the TTI a guard period symbol 704, e.g., contiguous after the data symbols 306.

The embodiment of the signal structure 300 according to FIG. 7 may be an extension of a physical format of the PSCCH and/or the PSSCH of the LTE V2X (e.g., according to 3GPP Release 14 or Release 15), in which the first symbol in each channel is assumed to be used for AGC settling at the receiver. In contrast to a convention signal structure, the SCI symbols 304 of the PSCCH are arranged before the data symbols 306 of the PSSCH in the (or each) TTI.

Figure 8:
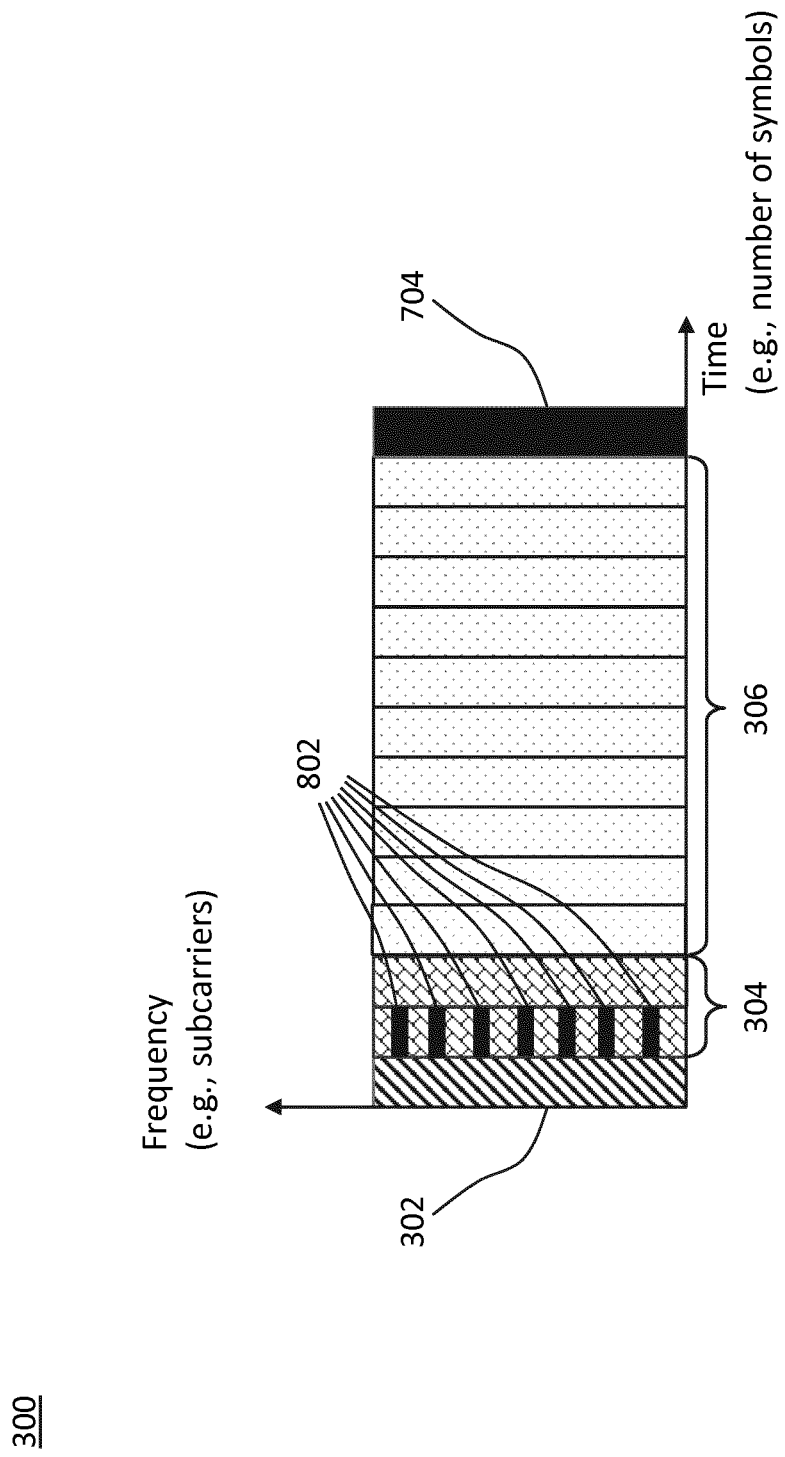
FIG. 8 shows a schematic time-frequency grid for a first embodiment of the signal structure of FIG. 3.

FIG. 8 shows a schematic time-frequency grid for an embodiment of the signal structure 300. The signal structure 300 may correspond to a resource mapping of PSCCH and PSSCH on a SL according to 3GPP NR, e.g., for V2X communications.

The AGC settling symbol 302 defines the beginning of the TTI. The SCI symbols 304 for the PSCCH follow (e.g., contiguously) the AGC settling symbol 302. The SCI symbols 304 optionally comprise DMRSs 802. The data symbols 306 for the PSSCH follow (e.g., contiguously) the SCI settling symbols 304. The symbols 306 for the PSSCH optionally comprise DMRSs.

Any embodiment of the signal structure 300 may be implemented according to 3GPP NR for V2X communication (i.e., on a SL). The multiplexing of the PSCCH and its PSSCH may be identical or similar to that of a 3GPP NR for cellular communication (i.e., on an uplink or downlink). In contrast to a conventional V2X communication according to 3GPP LTE, the PSCCH may precede the associated PSSCH in the same TTI (e.g., subframe) in the signal structure 300, example of which are illustrated in each of FIGS. 3, 7 and 8.

The temporal multiplexing of SCI symbols 304 (i.e., PSCCH) and data symbols 306 (i.e., PSSCH) has several advantages compared to the conventional frequency multiplexing illustrated in FIG. 17. For example, the signal structure 300 enables fast decoding of the PSSCH, since the receiving device 100 does not need to wait until the end of the TTI to start decoding the PSSCH (e.g., as opposed to what happens in LTE V2X).

Consequently, the AGC settling symbol 302 is followed by several symbols 304 for SCI (i.e., the control channel, PSCCH), and then by the symbols 306 of the data channel (e.g., the PSSCH). The PSCCH and the PSSCH may comprise independent DMRSs, so that each of the channels can use a different (e.g., spatial) transmission scheme.

The AGC settling symbol 302 may comprise at least one of the following examples, preferably opportunistic information. As a first illustrative example, the AGC settling symbol 302 comprises a training sequence that allows for setting the AGC. In terms of demodulation performance, this approach is not desirable, because it prevents the opportunistic use of the AGC settling symbol 302 for decoding one or more of the channels. As a second illustrative example, the AGC settling symbol 302 carries SCI, i.e., is allocated to the PSCCH. From a robustness point of view, this approach is not desirable, because the impact of losing PSCCH would be high. As a preferred example, the at least one AGC settling symbol 302 may comprise at least one data symbol carrying or allocated to the PSSCH. From a channel estimation point of view, a naïve implementation may not be desirable, e.g., since the ACG symbol and the PSSCH are not adjacent in time, so that the DMRSs of the data channel may not be useful for the demodulation of the AGC symbol anymore, especially when the channel changes very fast, which is typical for V2X communication at high vehicle velocities.

The technique may be implemented in the context of any direct communication between devices, which is referred to as SL (e.g., a PC5 communication in the terminology of 3GPP). While the technique is described for D2D and V2X communication, it is also applicable to any other similar types of communication. For conciseness and not limitation, the description of embodiments makes use of 3GPP terminology for the SL. Particularly the PSCCH is used as an example to denote any physical channel carrying control information. The PSSCH is used as an example to denote any physical channel carrying data. The PSCCH typically contains information needed to decode the associated PSSCH such as the time-frequency resources of the PSSCH and the modulation and coding scheme (MCS) for the PSSCH. Usually the PSCCH and the PSSCH have their own DMRSs needed by the receiving device 100 to estimate the propagation channel or channel state of the SL between the transmitting device 200 and the receiving device 200. Thereby, the receiving device 100 is able to decode the control information and the data, respectively.

Moreover, the term "symbol" may denote an OFDM symbol.

Any embodiment of the receiving device 100, the transmitting device 200, the signal structure 300, the receiving method 400, and the transmitting method 500 may comprise at least the following three features. As a first feature, a part of the first symbol 302 or the whole first symbol 302 is used by the receiving device 100 for settling its AGC circuit, followed by one or more SCI symbols 304 for the PSCCH as a second feature, which is followed by one or more data symbols 306 for the associated PSSCH as a third feature.

Such a transmission 500 typically occurs within one TTI (e.g., one slot or one subframe) and comprises several symbols. Each of FIGS. 3, 7, and 8 illustrates the above three features (optionally, further including a guard period at the end of the TTI).

In any embodiment described herein, the at least one first symbol 302 (i.e., the AGC settling symbol 302) may be constructed to allow for an efficient (e.g., opportunistic) use of it. That is, the AGC settling symbol 302 may be constructed to allow performing the AGC whenever necessary. At the same time, the AGC settling symbol 302 may be constructed to allow for exploiting the contents of the AGC settling symbol 302 to decode a channel for the cases when the AGC is already configured.

In the first embodiment, the AGC settling symbol 302 may carry the PSSCH or may be allocated to the PSSCH, but the AGC settling symbol 302 may transmit the PSSCH using the antenna port of the PSCCH. In other words, the AGC settling symbol 302 may be a PSSCH symbol that is associated with or decoded using the DMRS of the PSCCH (e.g., as opposed to the rest of PSSCH symbols 304, which use the DMRS of the PSSCH). The technical advantage of the first embodiment may be that no specific reference signal is needed for the data in the AGC settling symbol 302. For example, all resource elements (REs) in the AGC settling symbol 302 may be used for the data. The first embodiment is practical because the AGC settling symbol 302 and the PSCCH are next to each other. Hence, the channel is likely to not have changed much.

In the second embodiment, the AGC settling symbol 302 may carry data and have its own one or more DMRSs, which is used for its demodulation at the receiving device 100. The technical advantage of the second embodiment may be that it can give good channel estimate for the data resource elements in the AGC settling symbol 302, thereby improving the demodulation quality.

In the third embodiment, the AGC settling symbol 302 may carry data, e.g., using the same antenna port as the PSSCH. The receiving device 100 may use one or more DMRSs of the PSSCH, e.g., included in the SCI symbols 304, for demodulation of the AGC settling symbol 302. This is applicable, for example, when the relative velocity between the TX device 200 and the RX device 100 is so low that the coherence time of the channel (i.e., of the SL) is larger than the time interval between the AGC settling symbol 302 and the first PSSCH symbol 304 carrying one or more DMRSs. Thus, the DMRSs of the PSSCH symbols 304 are usable for the demodulation of the AGC settling symbol 302. The transmitting device 200 may determine when to perform the third embodiment based on its estimate of the rate of channel changes. The advantage of the third embodiment is that the whole AGC settling symbol 302 may be used to carry data.

In the fourth embodiment, the AGC settling symbol 302 may carry only one or more DMRSs. The DMRSs included in the AGC settling symbol 302 may be used for the demodulation of the PSCCH symbols 304. The technical advantage of the fourth embodiment is that the AGC settling symbol 302 can contribute to improving the channel estimation for the PSCCH symbols 304, which are the most important part in the transmission of the packet or self-contained TTI, because the PSCCH symbols 304 comprise details needed to decode the PSSCH symbols 306. The fourth embodiment is also practical, because the AGC settling symbol 302 is next to the PSCCH symbols 304 in time. In a preferred implementation, the one or more DMRSs in the AGC settling symbol 302 are not a mandatory part of the demodulation of the PSCCH symbols 304. The AGC settling symbol 302 may be rather an opportunistic part that can improve the quality of the demodulation.

Exemplary implementations of the four embodiments are described herein below.

According to the first embodiment, the AGC settling symbol 302 carries data and is transmitted using the same antenna port as the PSCCH 304. As a result, the receiver uses the DMRS of the PSCCH 304 to estimate the channel for demodulating and/or decoding the data in the AGC settling symbol 302.

In some implementations of the first embodiment, the transmitting device 200 places the one or more DMRS 802 of the PSCCH 304 as close as possible to the AGC settling symbol 302 to obtain good channel estimates for both the PSCCH 304 and the AGC settling symbol 302, as is schematically illustrated in FIG. 8. For example, if the PSCCH 304 consists of 2 consecutive OFDM symbols 304, the one or more DMRSs 802 are placed in the first symbol of PSCCH 304, so that the DMRSs 802 can result in a better estimate of the channel of the AGC settling symbol 302 (e.g., as compared to arranging the DMRSs in the second symbol of the PSCCH 304). The density of the DMRSs illustrated in FIG. 8 is only illustrative.

According to the second embodiment, the AGC settling symbol 302 carries data, e.g., by being allocated to the PSSCH in addition to the PSSCH symbols 306. The AGC settling symbol 302 comprises its own one or more DMRSs. The receiving device 100 uses the one or more DMRSs in the AGC settling symbol 302 to estimate the channel for demodulation of the data in the AGC settling symbol 302.

In some implementations of the second embodiment, the AGC settling symbol 302 is transmitted in the step 502 using the same antenna port as the PSCCH 304. In same or further implementations of the second embodiment, the AGC settling symbol 302 is transmitted using the same antenna port as the PSSCH 306.

In some implementations, the AGC settling symbol 302 is transmitted using a different antenna port other than the antenna port of the PSCCH 304 and/or the antenna port of the PSSCH 306.

In some implementations, the AGC settling symbol 302 is constructed in a comb-like manner. For example, every second subcarrier in the AGC settling symbol 302 is left empty (e.g., being fed with a value zero, being unloaded, or being left inactive). The remaining subcarriers (i.e., the active subcarriers) may carry either data or a DMRS.

Figure 9B:
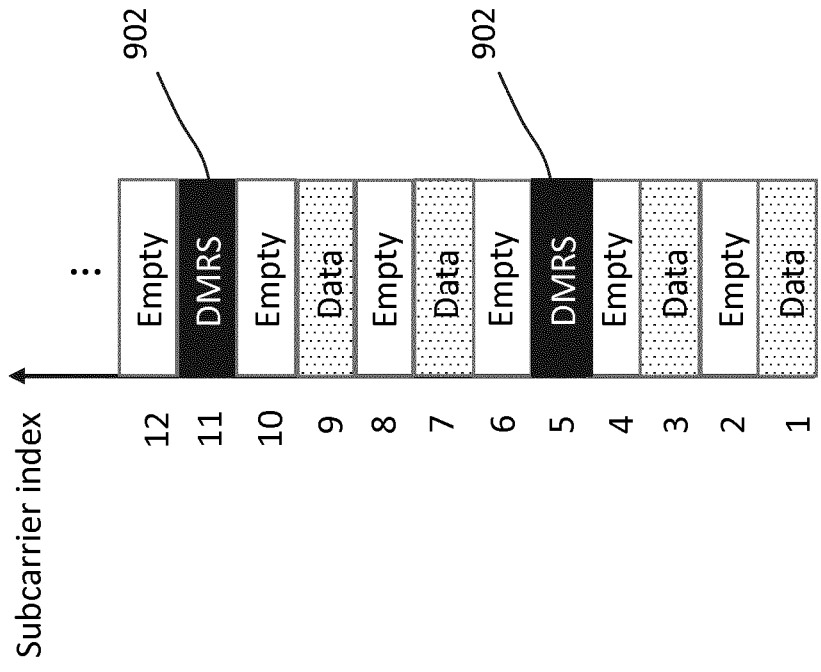
FIG. 9B schematically illustrates a second example of a subcarrier allocation for a data symbol, which is particularly implementable in the second embodiment.
Figure 9A:
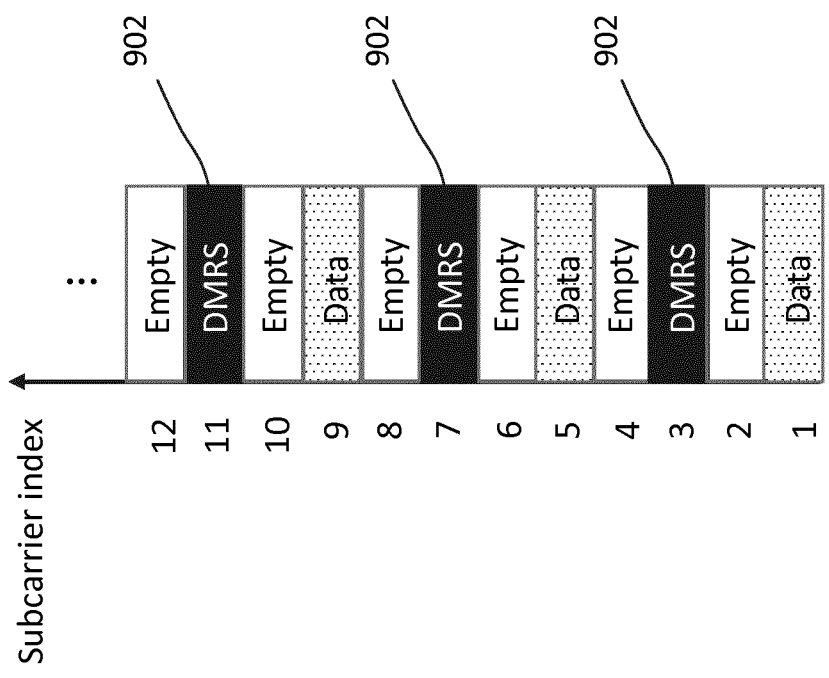
FIG. 9A schematically illustrates a first example of a subcarrier allocation for an AGC settling symbol, which is particularly implementable in a second embodiment.

For example, the one or more DMRSs 902 can be fed to every n active subcarriers, wherein n is a positive integer larger than or equal to 2. FIGS. 9A and 9B show examples for n=2 in FIG. 9A and n=3 in FIG. 9B.

According to the third embodiment, the ACG settling symbol 302 comprises PSSCH data. The AGC settling symbol 302 is transmitted using the same antenna port as the PSSCH 306.

Figure 10:
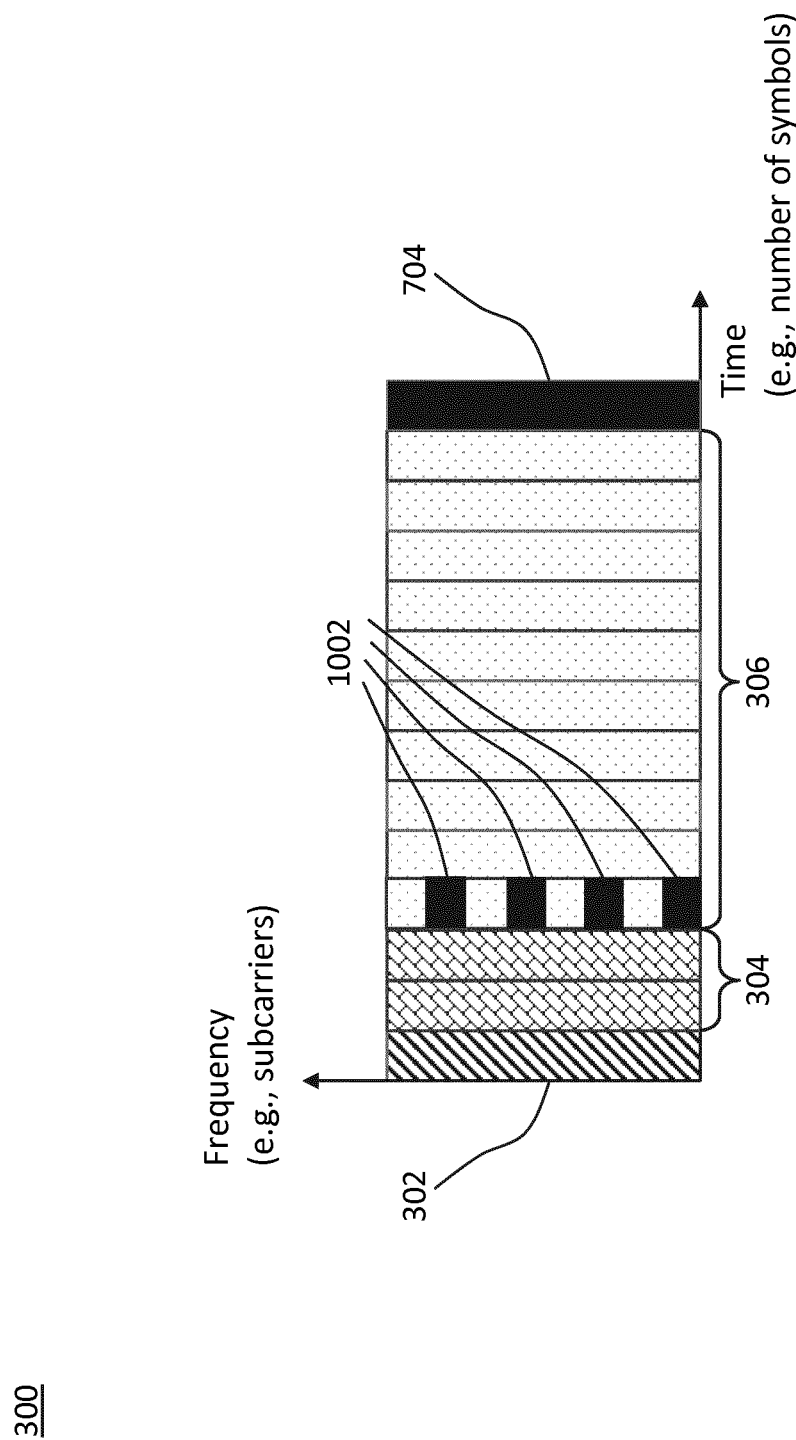
FIG. 10 shows a schematic time-frequency grid for a third embodiment of the signal structure of FIG. 3.

The demodulation of the AGC settling symbol 302 is performed based on the one or more DMRSs 1002 in the PSSCH 306, e.g., as schematically illustrated in FIG. 10. The DMRSs 1002 in the PSSCH 306 are used for the demodulation of the AGC settling symbol 302. For clarity, only DMRS resources 1002 in the first DMRS symbol of the PSSCH 306 are shown in the FIG. 10.

In some implementations of the third embodiment, the transmitting device 200 estimates how fast the channel (i.e., the SL) to the receiving device 100 will change, for example, based on measurements of channel state information reference signals or based on the absolute velocity of at least one of the transmitting device 200 and the receiving device 100, or based on the transmitting device 200 estimating the relative velocity between the transmitting device 200 and the receiving device 100. If the channel change is determined to be sufficiently slow that the DMRS in the PSSCH 306 can be used to estimate the channel for the AGC settling symbol 302, the transmitting device 200 determines to transmit data symbols of the PSSCH in the AGC settling symbol 302. For example, the channel change may be determined to be sufficiently slow when the relative velocity between the TX device 200 and the RX device 100 is so low that the coherence time of the channel (i.e., the SL) is larger than the time interval between the AGC settling symbol 302 and the first PSSCH symbol 304 carrying a DMRS.

In some implementations of the third embodiment, the PSCCH 304 carries information indicating that the AGC settling symbol 302 is carrying data for the PSSCH and that the AGC settling symbol 302 is transmitted using the same antenna port as the PSSCH symbols 306.

According to the fourth embodiment, the AGC settling symbol 302 contains only one or more DMRSs, which can be used to support the channel estimate of the PSCCH 304. This implies that the AGC settling symbol 302 is transmitted using the same antenna port as the PSCCH symbols 304.

The PSCCH 304 has its own DMRSs, and the DMRSs in the AGC settling symbol 302 can be used to improve the channel estimate quality for the PSCCH 304 if the AGC settling symbol 302 is not lost due to the AGC settling in the step 502.

In some implementations of the fourth embodiment, the DMRS in the ACG settling symbol 302 has the same frequency mapping (e.g., subcarrier allocation) as the DMRS in the PSCCH 304 (e.g., using the same subcarriers). This may facilitate an interpolation of the channel estimates in the time direction.

In some implementations of the fourth embodiment, the receiving device 100 applies a threshold after correlating the received AGC settling symbol 302 with a list of stored signal sequences for DMRSs to determine whether the AGC settling symbol 302 can be used in a channel estimation of the PSCCH 304. For example, if the output of the correlator exceeds the threshold, the receiving device 100 may determine that the AGC settling symbol 302 contains a DMRS sequence and was not lost due to the AGC settling process 402.

Figure 11:
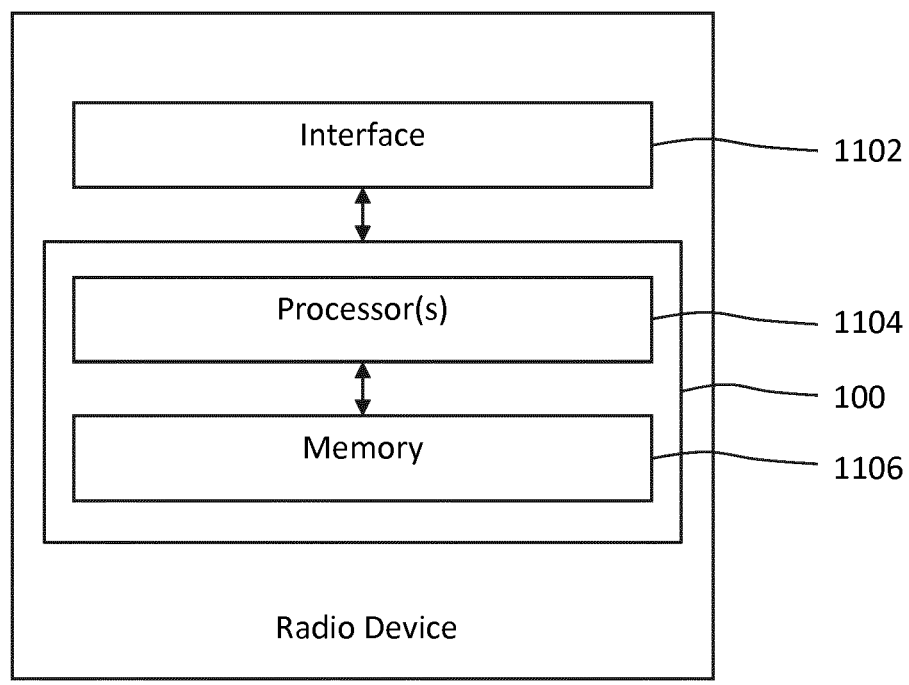
FIG. 11 shows a schematic block diagram of an implementation example of a further embodiment of the device of FIG. 1.

FIG. 11 shows a schematic block diagram for an embodiment of the device 100. The device 100 comprises one or more processors 1104 for performing the method 400 and memory 1006 coupled to the processors 1104. For example, the memory 1106 may be encoded with instructions that implement at least one of the modules 102 and 104.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1106, data receiver functionality. For example, the one or more processors 1104 may execute instructions stored in the memory 1106. Such functionality may include providing various features and steps discussed herein, including any of the benefits disclosed herein. The expression "the device being operative to perform an action" may denote the device 100 being configured to perform the action.

As schematically illustrated in FIG. 11, the device 100 may be embodied by a radio device 1100, e.g., functioning as a data receiver. The radio device 1100 comprises a radio interface 1102 coupled to the device 100 for radio communication with one or more other radio devices and/or one or more base stations.

Figure 12:
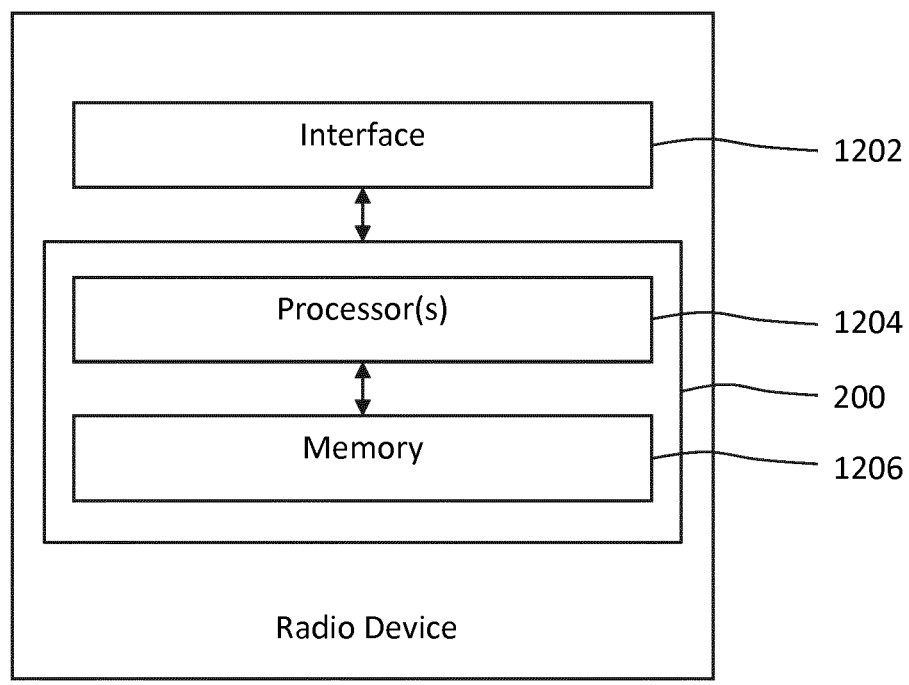
FIG. 12 shows a schematic block diagram of an implementation example of a further embodiment of the device of FIG. 2.

FIG. 12 shows a schematic block diagram for an embodiment of the device 200. The device 200 comprises one or more processors 1204 for performing the method 500 and memory 1206 coupled to the processors 1204. For example, the memory 1206 may be encoded with instructions that implement at least one of the modules 202, 204 and 206.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1206, data transmitter functionality. For example, the one or more processors 1204 may execute instructions stored in the memory 1206. Such functionality may include providing various features and steps discussed herein, including any of the benefits disclosed herein. The expression "the device being operative to perform an action" may denote the device 200 being configured to perform the action.

As schematically illustrated in FIG. 12, the device 200 may be embodied by a radio device 1200, e.g., functioning as a data transmitter. The radio device 1200 comprises a radio interface 1202 coupled to the device 200 for radio communication with one or more other radio devices and/or one or more base stations.

Figure 13:
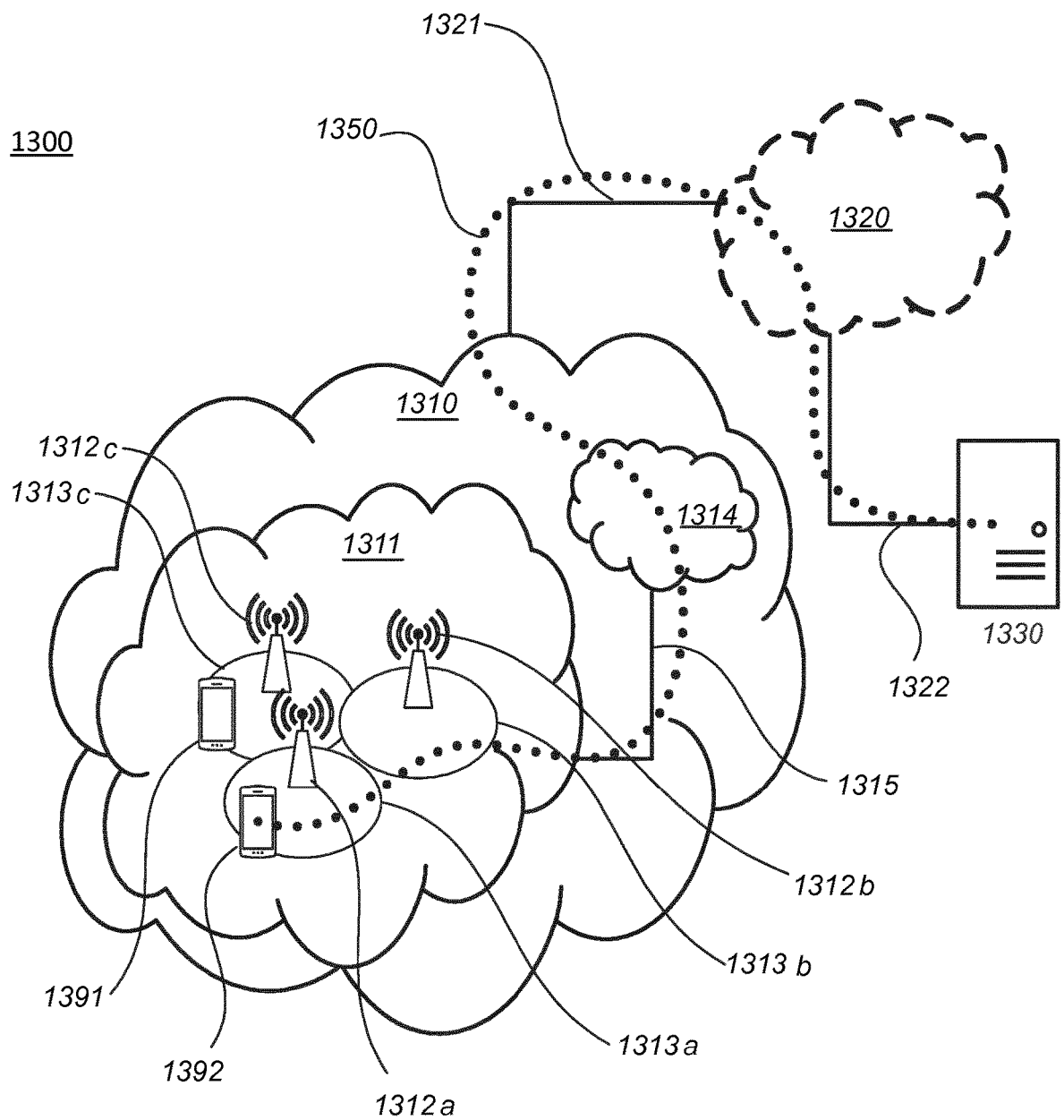
FIG. 13 schematically illustrates a telecommunication network connected via an intermediate network to a host computer.

With reference to FIG. 13, in accordance with an embodiment, a communication system 1300 includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first user equipment (UE) 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system 1300 of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 may not or need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data that is transmitted using the OTT connection 1450.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
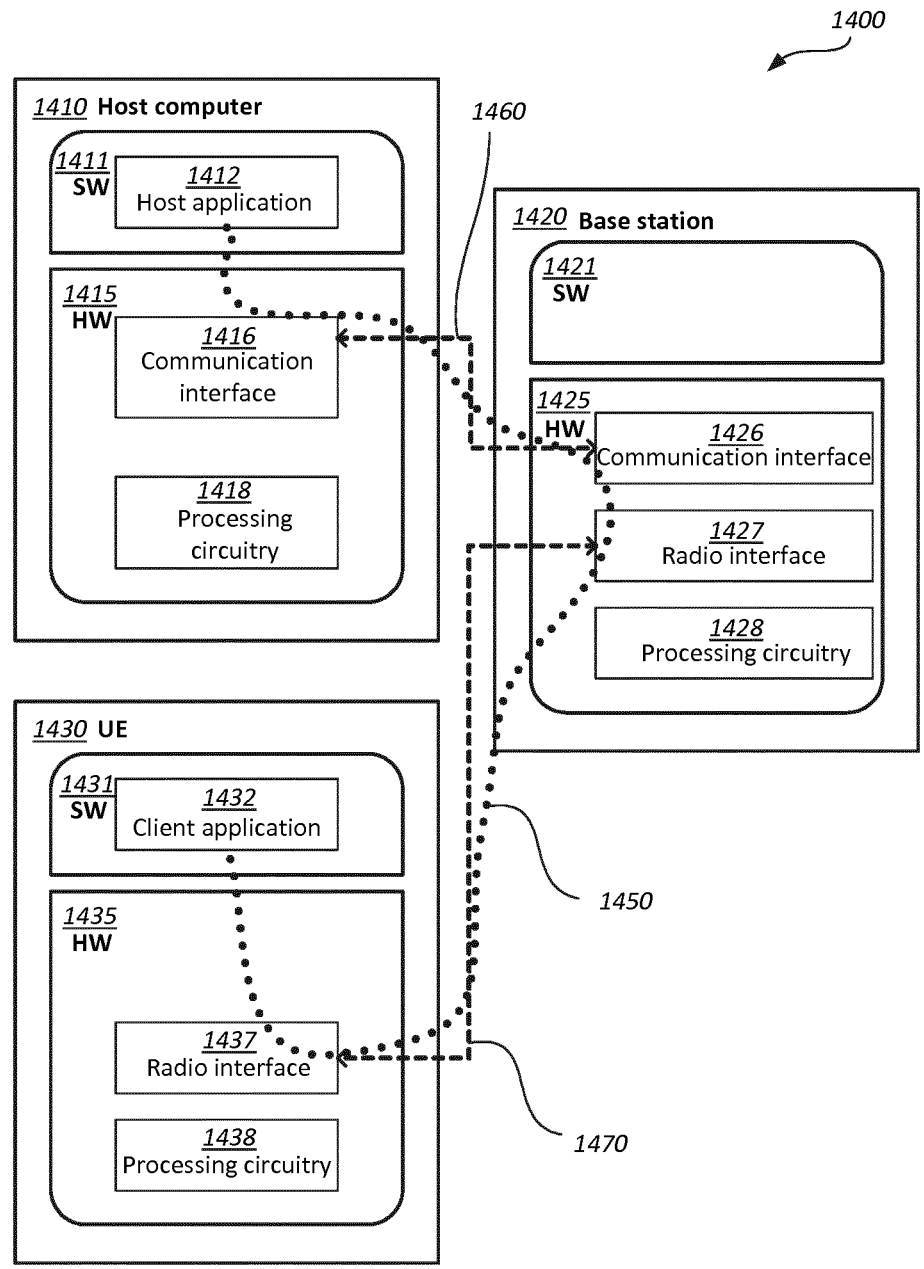
FIG. 14 shows a generalized block diagram of a host computer communicating via a base station with a user equipment over a partially wireless connection.

It is noted that the host computer 1410, base station 1420 and UE 1430 illustrated in FIG. 14 may be identical to the host computer 1330, one of the base stations 1312a, 1312b, 1312c and one of the UEs 1391, 1392 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the use equipment 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or "dummy" messages, using the OTT connection 1450 while it monitors propagation times, errors etc.

Figures 15, 16:
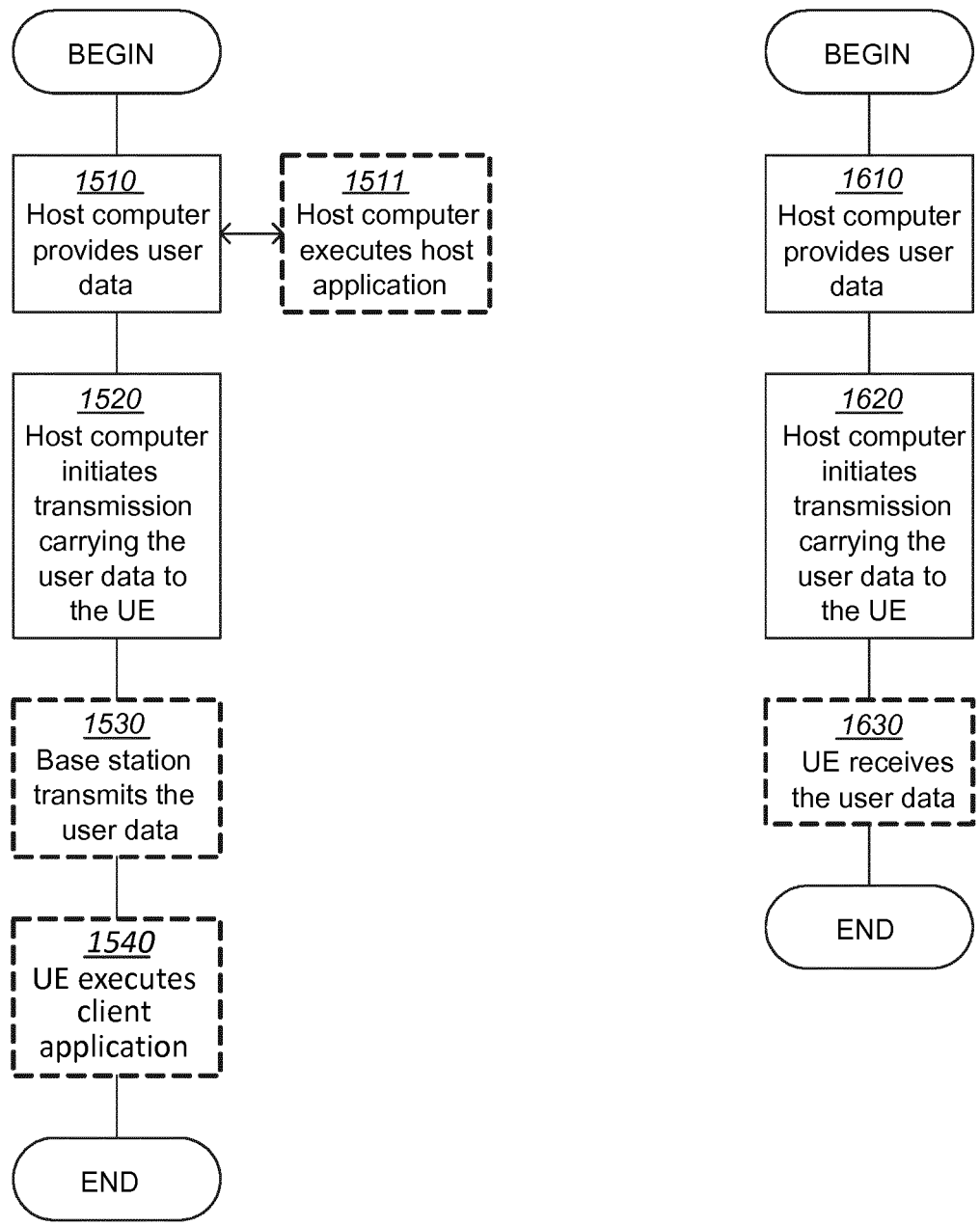
FIGS. 15 and 16 show flowcharts for methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

As has become apparent from above description, embodiments of the technique achieves at least one of the following two goals, optionally simultaneously. A first goal allows receivers to dynamically adjust their dynamic reception according to the strength of the received signals. A second goal is efficient and/or self-contained use of radio resources. Embodiments make use of the AGC settling resources when they are usable for carrying data transmission or for demodulation of the control information or data transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of receiving a sequence of symbols on a sidelink, SL, in a transmission time interval, TTI, the method comprising:
    performing an automatic gain control, AGC, for the SL based on at least one first symbol of the SL in the TTI;
    receiving, based on the AGC, SL control information, SCI, encoded in at least one second symbol of the SL in the TTI; and
    receiving, based on the SCI, data encoded in at least one third symbol of the SL in the TTI.

2. The method of claim 1, wherein at least one of:
    the at least one first symbol of the SL is received prior to the reception of the at least one second symbol of the SL in the TTI; and
    the at least one second symbol of the SL is received prior to the reception of the at least one third symbol of the SL in the TTI.

3. The method of claim 1, wherein at least one of:
    the at least one first symbol of the SL and the at least one second symbol of the SL are consecutive in the TTI; and
    the at least one second symbol of the SL and the at least one third symbol of the SL are consecutive in the TTI.

4. The method of claim 1, wherein the at least one first symbol comprises at least one reference signal.

5. The method of claim 4, wherein the at least one reference signal comprises at least one demodulation reference signal, DMRS.

6. The method of claim 4, wherein receiving the SCI one of comprises and initiates:
    demodulating the at least one second symbol using the at least one reference signal in the at least one first symbol.

7. The method of claim 6, wherein the step of performing the AGC one of comprises and is based on measuring a received power of the at least one first symbol at a mobile device receiving the SL.

8. The method of claim 1, wherein data is encoded in the at least one first symbol.

9. The method of claim 8, wherein the data and the at least one reference signal are multiplexed in the at least one first symbol in the frequency domain in a comb-like allocation of subcarriers in the at least one first symbol.

10. The method of claim 9, wherein the comb-like allocation of subcarriers in the at least one first symbol leaves every second subcarrier empty.

11. The method of claim 9, wherein the at least one reference signal is fed to every n active subcarriers, wherein n is a positive integer larger than or equal to 2.

12. The method of claim 8, wherein receiving the data encoded in the at least one first symbol one of comprises and initiates:
    demodulating the at least one first symbol based on the at least one reference signal included in the at least one first symbol.

13. The method of claim 8, wherein receiving the data encoded in the at least one first symbol one of comprises and initiates:
    demodulating the at least one first symbol based on reference signals included in the at least one second symbol.

14. The method of claim 13, wherein the reference signals included in the at least one second symbol comprise at least one demodulation reference signal, DMRS.

15. The method of claim 8, wherein receiving the data encoded in the at least one first symbol one of comprises and initiates:
    demodulating the at least one first symbol based on reference signals included in the at least one third symbol, if at least one of a velocity of a mobile device receiving the SL is less than an absolute velocity threshold, a relative velocity between the receiving mobile device and a mobile device transmitting the SL is less than a relative velocity threshold, and a rate of change of a channel state is less than a rate threshold.

16. The method of claim 1, wherein the at least one first symbol of the SL in the TTI is encoded redundantly to the data encoded in the at least one third symbol of the SL in the TTI.

17. The method of claim 1, wherein the SCI is indicative of whether the at least one first symbol comprises data.

18. The method of claim 1, wherein the SCI is indicative of whether the data encoded in the at least one first symbol is transmitted on an antenna port corresponding to one of reference signals included in the at least one first symbol, reference signals included in the at least one second symbol and reference signals included in the at least one third symbol.

19. The method of claim 18, wherein the reference signals included in at least one of the at least one first symbol, the at least one second symbol and the at least one third symbol comprise at least one demodulation reference signal, DMRS.

20. The method of claim 1, wherein the SCI is indicative of at least one of a modulation scheme and a coding scheme, and wherein the method further comprises decoding at least one of the data encoded in the at least one first symbol and the data encoded in the at least one third symbol according to at least one of the modulation scheme and the coding scheme.

* * * * *